US008345032B2

(12) United States Patent
Tomida et al.

(10) Patent No.: US 8,345,032 B2
(45) Date of Patent: Jan. 1, 2013

(54) DISPLAY APPARATUS, DISPLAY-APPARATUS DRIVING METHOD AND ELETRONIC INSTRUMENT

(75) Inventors: Masatsugu Tomida, Kanagawa (JP); Mitsuru Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 656 days.

(21) Appl. No.: 12/385,341

(22) Filed: Apr. 6, 2009

(65) Prior Publication Data

US 2009/0278833 A1 Nov. 12, 2009

(30) Foreign Application Priority Data

May 8, 2008 (JP) ................................ 2008-121999

(51) Int. Cl.
*G06F 3/038* (2006.01)

(52) U.S. Cl. ........................................ 345/211; 345/76

(58) Field of Classification Search ........................ None
See application file for complete search history.

(56) References Cited

U.S. PATENT DOCUMENTS

| | | | | |
|---|---|---|---|---|
| 7,825,879 | B2 * | 11/2010 | Yamashita et al. | 345/76 |
| 7,944,416 | B2 * | 5/2011 | Ono et al. | 345/77 |
| 2007/0268210 | A1 | 11/2007 | Uchino et al. | |
| 2008/0224964 | A1 * | 9/2008 | Tanikame et al. | 345/76 |

FOREIGN PATENT DOCUMENTS

| | | | |
|---|---|---|---|
| JP | 11-311977 | A | 11/1999 |
| JP | 2001-060076 | A | 3/2001 |
| JP | 2005-004173 | A | 1/2005 |
| JP | 2006-133542 | | 5/2006 |
| JP | 2007-310311 | | 11/2007 |
| JP | 2008-032863 | A | 2/2008 |

OTHER PUBLICATIONS

Japanese Office Office Action issued Apr. 13, 2010 for corresponding Japanese Application No. 2008-121999.

* cited by examiner

*Primary Examiner* — Jason Olson
(74) *Attorney, Agent, or Firm* — Rader Fishman & Grauer, PLLC

(57) ABSTRACT

Disclosed herein is a display apparatus including a pixel matrix section including pixel circuits laid out to form a pixel matrix to serve as pixel circuits each having an electro optical device, a signal writing transistor, a signal storage capacitor, and a device driving transistor, and a power-supply section configured to change a power-supply electric potential appearing on a power-supply line for providing a driving current flowing to the device driving transistor from one level to another in order to control transitions from a light emission period of the electro optical device to a no-light emission period of the electro optical device and vice versa, and stopping an operation to assert the power-supply electric potential on the power-supply line during a portion of the no-light emission period of the electro optical device.

8 Claims, 16 Drawing Sheets

DISPLAY APPARATUS, DISPLAY-APPARATUS DRIVING METHOD AND ELETRONIC INSTRUMENT

BACKGROUND OF THE INVENTION

1. Field of the Invention

In general, the present invention relates to a display apparatus, a driving method provided for the display apparatus and an electronic instrument employing the display apparatus. In particular, the present invention relates to a display apparatus having the type of a flat panel employing pixel circuits laid out 2-dimensionally to form a matrix as pixels each including an electro optical device and relates to a method provided for driving the display apparatus as well as an electronic instrument employing the display apparatus.

2. Description of the Related Art

In recent years, in the field of display apparatus for displaying images, a display apparatus having the type of a flat panel employing pixel circuits laid out 2-dimensionally to form a matrix as pixel circuits each including an electro optical device serving as a light emitting device has been becoming popular at a high pace. The electro optical device employed in each pixel circuit of a flat-panel display apparatus is a light emitting device of the so-called current-driven type in which the luminance of light emitted by the light emitting device varies in accordance with the magnitude of a driving current flowing through the device. An example of a flat-panel display apparatus employing pixel circuits each including a light emitting device of the so-called current-driven type is an organic EL (Electro Luminescence) display apparatus employing pixel circuits each including an organic EL device serving as a light emitting device. An organic EL display apparatus employs pixel circuits each including an organic EL device each making use of a phenomenon in which light is generated when an electric field is applied to an organic thin film of the organic EL device.

An organic EL display apparatus employing pixel circuits each including an organic EL device serving as an electro optical device has the following characteristics. An organic EL device has a low power consumption since the device is capable of operating even if the device is driven by an applied voltage set at a low level not exceeding 10 V. In addition, since an organic EL device is a device generating light by itself, an image generated by the light exhibits a high degree of recognizability in comparison with a liquid-crystal display apparatus displaying an image in accordance with an operation to control the luminance of light generated by a light source known as a backlight for a liquid crystal employed in every pixel circuit. On top of that, since an organic EL display apparatus does not desire an illumination member such as a backlight, the apparatus can be made light and thin with ease. Moreover, since an organic EL device has a very short response time of about few microseconds, no residual image is generated at a display time.

Much like a liquid-crystal display apparatus, the organic EL display apparatus can adopt either a simple (passive) or active matrix method as its driving method. However, even though a display apparatus adopting the passive matrix method has a simple structure, the light emission period of the electro optical device decreases as the number of scan lines (that is, the number of pixel circuits) increases. Thus, the organic EL display apparatus raises a problem of difficulties in implementing a large-size and high-definition model.

For the reason described above, display apparatus adopting the active matrix method are developed extensively in recent years. In accordance with the active matrix method, an active device for controlling a driving current flowing through an electro optical device is provided in the same pixel circuit as the electro optical device. An example of the active device is a field effect transistor of the insulated-gate type. The field effect transistor of the insulated-gate type is generally a TFT (Thin Film Transistor). In a display apparatus adopting the active matrix method, each electro optical device is capable of sustaining the state of emitting light throughout the period of one frame. It is thus easy to implement a large-size and high-definition display apparatus adopting the active matrix method.

By the way, an I-V characteristic exhibited by the organic EL device as a characteristic representing a relation between a voltage applied to the device and a driving current flowing to the device as a result of applying the voltage thereto generally deteriorates with the lapse of time as is commonly known. The deterioration with the lapse of time is also referred to as time degradation. In a pixel circuit employing a TFT of the N-channel type as a device driving transistor for generating a driving current flowing to the organic EL device included in the pixel circuit, the source electrode of the TFT is connected to the organic EL device. Thus, due to the time degradation of the I-V characteristic exhibited by the organic EL device, a voltage Vgs applied between the gate and source electrodes of the device driving transistor changes and, as a result, the luminance of light emitted by the organic EL device also changes as well. In the following description, the technical term 'device driving transistor' is used to imply a TFT for generating a driving current flowing to the organic EL device.

What has been described above is explained more concretely as follows. An electric potential appearing on the source gate of a device driving transistor is determined by the operating point of the device driving transistor and the organic EL device. Due to the time degradation of the I-V characteristic of the organic EL device, the operating point of the device driving transistor and the organic EL device changes undesirably. Thus, even if the voltage applied to the gate electrode of the device driving transistor remains unchanged, the electric potential appearing on the source gate of a device driving transistor changes. That is, the voltage Vgs applied between the gate and source electrodes of the device driving transistor changes. Thus, a driving current flowing through the device driving transistor also changes as well. As a result, a driving current flowing through the organic EL device also changes so that the luminance of light emitted by the organic EL device varies even if the voltage applied to the gate electrode of the device driving transistor remains unchanged.

In addition, in a pixel circuit employing a poly-silicon TFT as the device driving transistor, besides the time degradation of the I-V characteristic of the organic EL device, the threshold voltage Vth of the device driving transistor and the mobility μ of a semiconductor thin film composing a channel in the device driving transistor also change due to the time degradation. In the following description, the mobility μ of a semiconductor thin film composing a channel in the device driving transistor is referred to simply as the mobility μ of the device driving transistor. In addition, the threshold voltage Vth and the mobility μ which represent the characteristics of the device driving transistor also change from pixel to pixel due to variations in manufacturing process. That is, the characteristics of the device driving transistor vary from pixel to pixel.

If the threshold voltage Vth and mobility μ of the device driving transistor change from pixel to pixel due to variations in manufacturing process and/or due to the time degradation, the driving current flowing through the device driving transistor also changes from pixel to pixel as well even if the voltage applied between the gate and source electrodes of the device driving transistor remains unchanged. Thus, even if the voltage applied between the gate and source electrodes of the device driving transistor remains unchanged, the luminance of light emitted by the organic EL device also varies from pixel to pixel as well. As a result, screen uniformity is lost.

In order to sustain the luminance of light emitted by the organic EL device at a constant value not affected by variations of the I-V characteristic of the organic EL device, variations of the threshold voltage Vth of the device driving transistor and variations of the mobility μ of the device driving transistor for a constant voltage applied between the gate and source electrodes of the device driving transistor even if the I-V characteristic of the organic EL device, the threshold voltage Vth and the mobility μ change due to the time degradation, as disclosed in Japanese Patent Laid-open No. 2006-133542, it is thus necessary to provide a configuration including a variety of compensation functions.

The compensation functions of each pixel circuit include a compensation function for compensating the luminance of light emitted by the organic EL device for variations of the I-V characteristic of the organic EL device, a compensation function for compensating the luminance of light emitted by the organic EL device for variations of the threshold voltage Vth of the device driving transistor and a compensation function for compensating the luminance of light emitted by the organic EL device for variations of the mobility μ of the device driving transistor. In the following description, the process of compensating the luminance of light emitted by the organic EL device for variations of the threshold voltage Vth of the device driving transistor is referred to as a threshold-voltage compensation process whereas the process of compensating the luminance of light emitted by the organic EL device for variations of the mobility μ of the device driving transistor is referred to as a mobility compensation process.

By providing each pixel circuit with a compensation function for compensating the luminance of light emitted by the organic EL device for variations of the I-V characteristic of the organic EL device, a compensation function for compensating the luminance of light emitted by the organic EL device for variations of the threshold voltage Vth of the device driving transistor and a compensation function for compensating the luminance of light emitted by the organic EL device for variations of the mobility μ of the device driving transistor as described above, it is possible to sustain the luminance of light emitted by the organic EL device at a constant value not affected by variations of the I-V characteristic of the organic EL device, variations of the threshold voltage Vth and variations of the mobility μ of the device driving transistor for a constant voltage applied between the gate and source electrodes of the device driving transistor even if the I-V characteristic of the organic EL device changes due to the time degradation whereas the threshold voltage Vth and the mobility μ change due to the time degradation and/or variations in manufacturing process. However, the number of components employed in every pixel circuit increases. Therefore, there are raised problems of difficulties to reduce the size of the pixel circuit due to the increased number of components employed in every pixel circuit and, thus, difficulties to implement a high-definition display apparatus.

In the mean time, as an example, there has also been proposed a pixel circuit capable of changing a power-supply electric potential appearing on a power-supply line for providing a driving current to the device driving transistor. Since the power-supply electric potential appearing on a power-supply line for providing a driving current to the device driving transistor can be changed, the pixel circuit does not desire a transistor for controlling transitions from a light emission period of the electro optical device to a no-light emission period of the electro optical device and vice versa. As a matter of fact, the pixel circuit also does not desire a transistor for initializing an electric potential appearing on the source electrode of the device driving transistor and a transistor for initializing an electric potential appearing on the gate electrode of the device driving transistor. For more information on the proposed pixel circuit, the reader is suggested to refer to documents such as Japanese Patent Laid-open No. 2007-310311. Since the transistor for controlling the transitions from a light emission period of the electro optical device to a no-light emission period of the electro optical device and vice versa and the transistors for initializing the electric potentials appearing on the source and gate electrodes of the device driving transistor can be omitted, the number of components employed in every pixel circuit and the number of wires connecting such components can be reduced.

SUMMARY OF THE INVENTION

In accordance with the existing technology disclosed in Japanese Patent Laid-open No. 2007-310311, the number of components employed in every pixel circuit and the number of wires connecting such components can be reduced. Thus, it is possible to reduce the size of the pixel circuit and, thus, possible to implement a high-definition display apparatus. In the case of this pixel circuit, a configuration is adopted for controlling transitions from the light emission period of the electro optical device to the no-light emission period of the electro optical device and vice versa by changing the power-supply electric potential appearing on a power-supply line for providing a driving current to the device driving transistor. To put it in detail, in order to make a transition from the light emission period of the electro optical device to the no-light emission period of the electro optical device, the power-supply electric potential appearing on the power-supply line is changed to a low level in order to apply a reversed bias to the electro optical device so that the electro optical device is set in a state of no-light emission.

If the electro optical device is set in a reversed-bias state, however, electrical stress is generated in the electro optical device even though the electro optical device is not emitting light. If a period during which the electrical stress is being generated in the electro optical device is long, screen uniformity is lost due to, among other causes, the fact that the characteristics of the electro optical device deteriorate and the electro optical device becomes defective in a state of being incapable of emitting light.

Addressing the problems described above, inventors of the present invention have innovated a display apparatus capable of reducing the amount of electrical stress generated by a reversed bias applied to the electro optical device during a no-light emission period. The inventors have also innovated a method for driving the display apparatus and an electronic instrument employing the display apparatus.

In order to solve the problems described above, there is provided a display apparatus employing pixel circuits laid out to form a pixel matrix to serve as pixel circuits each having: an electro optical device; a signal writing transistor for writing a video signal into a signal storage capacitor; the signal storage capacitor for holding the video signal written by the signal writing transistor into the signal storage capacitor; and a device driving transistor for driving the electro optical device in accordance with the video signal held by the signal storage capacitor.

In an operation to drive the electro optical device by making use of the device driving transistor, a power-supply electric potential appearing on a power-supply line for providing a driving current flowing to the device driving transistor is changed from one level to another in order to control transitions from a light emission period of the electro optical device to a no-light emission period of the electro optical device and vice versa and, in a portion of the no-light emission period of the electro optical device, an operation to assert the power-supply electric potential on the power-supply line is stopped.

As described above, in order to make a transition from a light emission period of the electro optical device to a no-light emission period of the electro optical device, the power-supply electric potential appearing on the power-supply line is changed to a low level in order to apply a reversed bias to the electro optical device so that the electro optical device is set in a state of no-light emission. If the electro optical device is set in a reversed-bias state, however, electrical stress is generated in the electro optical device. In order to solve a problem caused by the electrical stress generated by the reversed bias, in the portion of the no-light emission period of the electro optical device, an operation to assert the power-supply electric potential appearing on the power-supply line is halted as described above. While the operation carried out in the portion of the no-light emission period as an operation to assert the power-supply electric potential appearing on the power-supply line is being halted, the power-supply line is put in a state of being floated. A specific one of the electrodes of the device driving transistor is connected to the power-supply line whereas another electrode of the device driving transistor is connected to the anode terminal of the electro optical device on the side opposite to the specific electrode of the device driving transistor with respect to the device driving transistor. Thus, the specific electrode of the device driving transistor is also put in a state of being floated. On the other hand, an electric potential appearing on the other electrode of the device driving transistor becomes equal to a sum of an electric potential appearing on the cathode terminal of the electro optical device and the threshold voltage of the electro optical device. Thus, during the portion of the no-light emission period, no reversed bias is applied to the electro optical device. Therefore, the length of a period in which the reversed bias is being applied to the electro optical device is reduced. As a result, the amount of electrical stress generated in the electro optical device due to the applied reversed bias is also decreased as well.

In accordance with the embodiments of the present invention, it is possible to reduce the amount of electrical stress generated by a reversed bias applied to the electro optical device during a no-light emission period. It is thus possible to prevent the characteristics of the electro optical device from changing and the electro optical device from becoming defective in a state of being incapable of emitting light or incapable of emitting light due to the electrical stress.

DETAILED DESCRIPTION OF THE PREFERRED EMBODIMENTS

Preferred embodiments of the present invention are explained in detail by referring to diagrams as follows.

System Configuration

Figure 1:
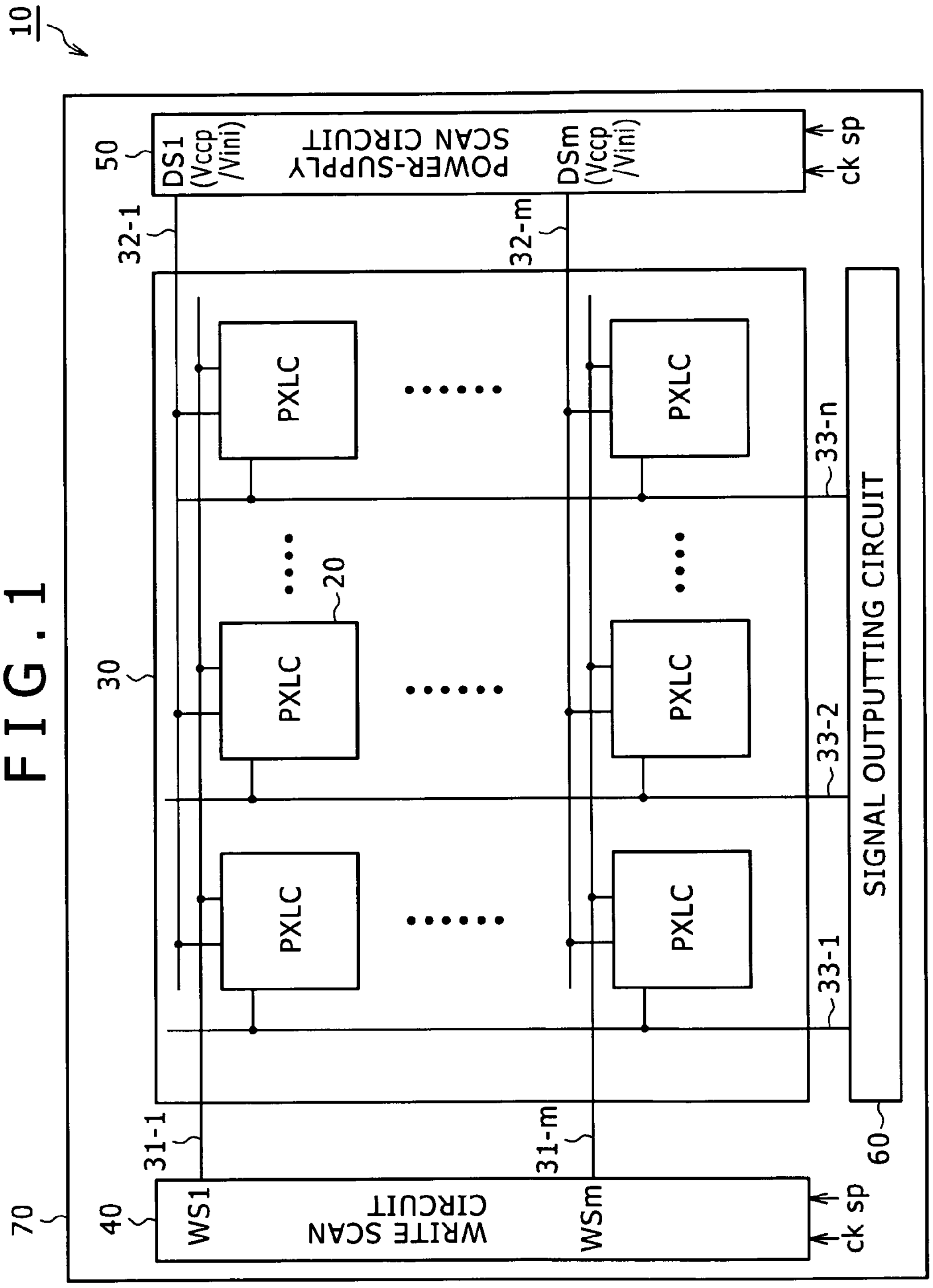
FIG. 1 is a block diagram showing a rough configuration of an active-matrix organic EL display apparatus to which the embodiments of the present invention is applied.

FIG. 1 is a system-configuration diagram showing a rough configuration of an active-matrix type display apparatus to which the embodiments of the present invention is applied. As an example, each pixel circuit employed in the active-matrix type display apparatus has a current-driven light emitting device serving as an electro optical device which emits light at a luminance determined by the magnitude of a driving current flowing through the electro optical device. A typical example of such an electro optical device is an organic EL device. The display apparatus employing pixel circuits each having an organic EL device serving as a light emitting device is referred to as an active-matrix type organic EL display apparatus which is explained below as a typical active-matrix type display apparatus.

As shown in the system-configuration diagram of FIG. 1, an organic EL display apparatus 10 serving as a typical example of the active-matrix type display apparatus employs a pixel matrix section 30 and driving sections provided at locations surrounding the pixel matrix section 30 as driving sections each used for driving a plurality of pixel circuits (PXLCs) 20 employed in the pixel matrix section 30. In the pixel matrix section 30, the pixel circuits 20 each including a light emitting device are arranged 2-dimensionally to form a pixel matrix. The driving sections are typically a write scan circuit 40, a power-supply scan circuit 50 and a signal outputting circuit 60.

In the case of an active-matrix organic EL display apparatus 10 for showing a color display, each of the pixel circuits 20 includes a plurality of sub-pixel circuits each functioning as a pixel circuit 20. To put it more concretely, in an active-matrix organic EL display apparatus 10 for showing a color display, each of the pixel circuits 20 includes three sub-pixel circuits, i.e., a sub-pixel circuit for emitting red light (that is, light of the R color), a sub-pixel circuit for emitting green light (that is, light of the G color) and a sub-pixel circuit for emitting blue light (that is, light of the B color).

However, combinations of sub-pixel circuits each functioning as a pixel circuit are by no means limited to the above combination of the sub-pixel circuits for the three primary colors, i.e., the R, G and B colors. For example, a sub-pixel circuit of another color or even a plurality of sub-pixel circuits for a plurality of other colors can be added to the sub-pixel circuits for the three primary colors to function as a pixel circuit. To put it more concretely, for example, a sub-pixel circuit for generating light of the white (W) color for increasing the luminance can be added to the sub-pixel circuits for the three primary colors to function as a pixel circuit. As another example, sub-pixel circuits each used for generating light of a complementary color can be added to the sub-pixel circuits for the three primary colors to function as a pixel circuit with an increased color reproduction range.

For the m-row/n-column matrix of pixel circuits 20 arranged to form m rows and n columns in the pixel matrix section 30, scan lines 31-1 to 31-*m* and power-supply lines 32-1 and 32-*m* are provided, being oriented in the row direction or the horizontal direction in the block diagram of FIG. 1. The row direction is the direction of every matrix row along which pixel circuits 20 are arranged. To be more specific, each of the scan lines 31-1 to 31-*m* and each of the power-supply lines 32-1 and 32-*m* are provided for one of the m rows of the matrix of pixel circuits 20. In addition, the m-row/n-column matrix of pixel circuits 20 in the pixel matrix section 30 is also provided with signal lines 33-1 to 33-*n* each oriented in the column direction or the vertical direction in the block diagram of FIG. 1. The column direction is the direction of every matrix column along which pixel circuits 20 are arranged. To be more specific, each of the signal lines 33-1 to 33-*n* is provided for one of the n columns of the matrix of pixel circuits 20.

Any specific one of the scan lines 31-1 to 31-*m* is connected to an output terminal employed in the write scan circuit 40 as an output terminal associated with a row for which the specific scan line 31 is provided. By the same token, any specific one of the power-supply lines 32-1 to 32-*m* is connected to an output terminal employed in the power-supply scan circuit 50 as an output terminal associated with a row for which the specific power-supply line 32 is provided. On the other hand, any specific one of the signal lines 33-1 to 33-*n* is connected to an output terminal employed in the signal outputting circuit 60 as an output terminal associated with a column for which the specific signal line 33 is provided.

The pixel matrix section 30 is normally created on a transparent insulation substrate such as a glass substrate. Thus, the active-matrix organic EL display apparatus 10 can be constructed to have a flat panel structure. Each of the write scan circuit 40, the power-supply scan circuit 50 and the signal outputting circuit 60 each functioning as a driving section configured to drive the pixel circuits 20 included in the pixel matrix section 30 can be composed of amorphous silicon TFTs (Thin Film Transistors) or low-temperature silicon TFTs. If low-temperature silicon TFTs are used, each of the write scan circuit 40, the power-supply scan circuit 50 and the signal outputting circuit 60 can also be created on a display panel 70 (or the substrate) composing the pixel matrix section 30.

The write scan circuit 40 includes a shift register for sequentially shifting (propagating) a start pulse sp in synchronization with a clock pulse signal ck. In an operation to write video signals into the pixel circuits 20 employed in the pixel matrix section 30, the write scan circuit 40 sequentially supplies the start pulse sp as one of write pulses (or scan signals) WS1 to WSm to one of the scan lines 31-1 to 31-*m*. The write pulses supplied to the scan lines 31-1 to 31-*m* are thus used for scanning the pixel circuits 20 employed in the pixel matrix section 30 sequentially in row units in the so-called a line-by-line sequential scan operation to put pixel circuits 20 provided on the same row in a state of being enabled to receive the video signals at one time.

By the same token, the power-supply scan circuit 50 also includes a shift register for sequentially shifting (propagating) a start pulse sp in synchronization with a clock pulse signal ck. In synchronization with the line-by-line sequential scan operation carried out by the write scan circuit 40, that is, with timings determined by the start pulse sp, the power-supply scan circuit 50 supplies power-supply line electric potentials DS1 to DSm to the power-supply lines 32-1 to 32-*m* respectively. Each of the power-supply line electric potentials DS1 to DSm is switched from a first power-supply electric potential Vccp to a second power-supply electric potential Vini lower than the first power-supply electric potential Vccp and vice versa in order to control the light emission state and no-light emission state of the pixel circuits 20 in row units and in order to supply a driving current to organic EL devices, which are each employed in the pixel circuit 20 as a light emitting device, in row units.

The signal outputting circuit 60 properly selects the voltage Vsig of a video signal representing luminance information received from a signal source not shown in the block diagram of FIG. 1 or a reference electric potential Vofs and writes the selected one into the pixel circuits 20 employed in the pixel matrix section 30 typically in row units through the signal lines 33-1 to 33-*n*. In the following description, the video-signal voltage Vsig, which is the voltage of a video signal representing luminance information received from the signal source, is also referred to as a signal voltage. That is, the signal outputting circuit 60 adopts a driving method of a line-by-line sequential writing operation for writing the video-signal voltage Vsig into pixel circuits 20 in a state of being enabled to receive the video-signal voltage Vsig in row units. This is because the pixel circuits 20 are put in a state of being enabled to receive the video-signal voltage Vsig in row units as explained before.

Pixel Circuits

Figure 2:
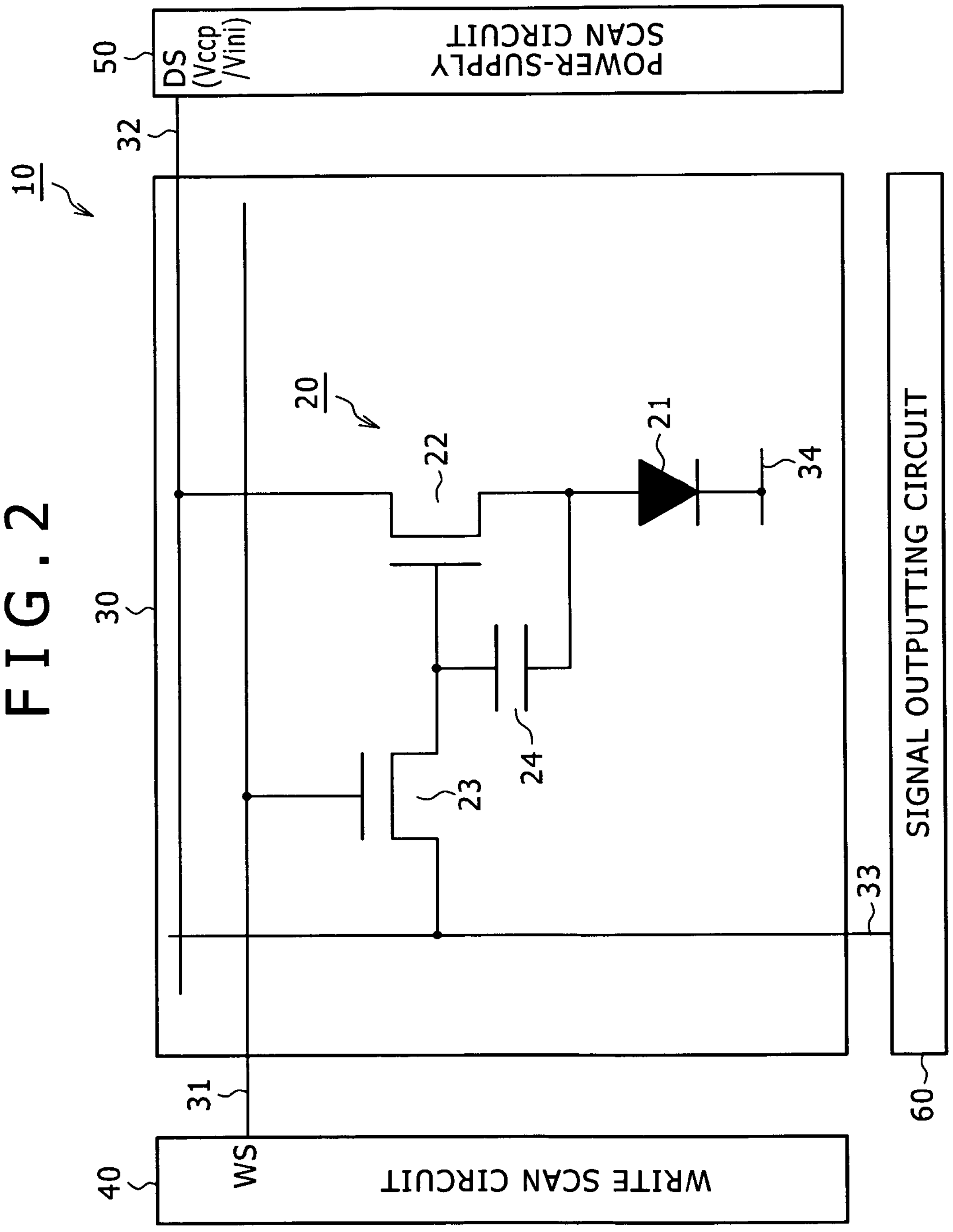
FIG. 2 is a diagram showing a concrete typical configuration of a pixel circuit employed in the organic EL display apparatus.

FIG. 2 is a diagram showing a concrete typical configuration of the pixel circuit 20.

As shown in the diagram of FIG. 2, the pixel circuit 20 includes an organic EL device 21 serving as an electro optical device (or a current-driven light emitting device) which changes the luminance of light generated thereby in accordance with the magnitude of a current flowing through the device. The pixel circuit 20 also has a driving circuit for driving the organic EL device 21. The cathode electrode of the organic EL device 21 is connected to a common power-supply line 34 shared by all pixel circuits 20. The common power-supply line 34 is also referred to as the so-called beta line.

As described above, in addition to the organic EL device 21, the pixel circuit 20 also has the driving circuit composed of driving components including the device driving transistor 22 mentioned above, the signal writing transistor 23 and the signal storage capacitor 24. In the typical configuration of the pixel circuit 20, each of the device driving transistor 22 and the signal writing transistor 23 is an N-channel TFT. However, conduction types of the device driving transistor 22 and the signal writing transistor 23 are by no means limited to the N-channel conduction type. That is, the conduction types of the device driving transistor 22 and the signal writing transistor 23 can each be another conduction type or can be conduction types different from each other.

It is to be noted that, if an N-channel TFT is used as each of the device driving transistor 22 and the signal writing transistor 23, an amorphous silicon (a-Si) process can be applied to the fabrication of the pixel circuit 20. By applying the amorphous silicon (a-Si) process to the fabrication of the pixel circuit 20, it is possible to reduce the cost of a substrate on which the TFTs are created and, hence, reduce the cost of the active-matrix organic EL display apparatus 10 itself. In addition, if the device driving transistor 22 and the signal writing transistor 23 have the same conduction type, the same process can be used for creating the device driving transistor 22 and the signal writing transistor 23. Thus, the same conduction type of the device driving transistor 22 and the signal writing transistor 23 contributes to the cost reduction.

One of the electrodes (that is, either the source or drain electrode) of the device driving transistor 22 is connected to the anode electrode of the organic EL device 21 whereas the other electrode (that is, either the drain or source electrode) of the device driving transistor 22 is connected to the power-supply line 32, that is, one of the power-supply lines 32-1 to 32-*m*.

The gate electrode of the signal writing transistor 23 is connected to the scan line 31, that is, one of the scan lines 31-1 to 31-*m*. One of the electrodes (that is, either the source or drain electrode) of the signal writing transistor 23 is connected to the signal line 33, that is, one of the signal lines 33-1 to 33-*n*, whereas the other electrode (that is, either the drain or source electrode) of the signal writing transistor 23 is connected to the gate electrode of the device driving transistor 22.

In the device driving transistor 22 and the signal writing transistor 23, one of the electrodes is a metallic wire connected to the source or drain area of the transistor whereas the other electrode is a metallic wire connected to the drain or source area of the transistor. In addition, in accordance with a relation between an electric potential appearing on one of the electrodes and an electric potential appearing on the other electrode, one of the electrodes becomes a source or drain electrode whereas the other electrode becomes the drain or source electrode.

One of the terminals of the signal storage capacitor 24 is connected to the gate electrode of the device driving transistor 22 whereas the other terminal of the signal storage capacitor 24 is connected to one of the electrodes of the device driving transistor 22 and the anode electrode of the organic EL device 21.

It is to be noted that the configuration of the driving circuit for driving the organic EL device 21 is by no means limited to the configuration employing the device driving transistor 22, the signal writing transistor 23 and the signal storage capacitor 24 as described above. For example, if necessary, the driving circuit may include a supplementary capacitor having a capacitance for compensating the organic EL device 21 for an insufficiency of the capacitance of the organic EL device 21. One of the terminals of the supplementary capacitor is connected to the anode electrode of the organic EL device 21 whereas the other terminal of the supplementary capacitor is connected to the cathode electrode of the organic EL device 21. As described above, the cathode electrode of the organic EL device 21 is connected to the common power-supply line 34 which is set at a fixed electric potential.

In the pixel circuit 20 having the configuration described above, the signal writing transistor 23 is put in a conductive state by a high-level scan signal WS applied by the write scan circuit 40 to the gate electrode of the signal writing transistor 23 through the scan line 31, that is, one of the scan lines 31-1 to 31-*m*. In this conductive state of the signal writing transistor 23, the signal writing transistor 23 samples the video-signal voltage Vsig supplied by the signal outputting circuit 60 through the signal line 33 (that is, one of the signal lines 33-1 to 33-*n*) as a voltage having a magnitude representing luminance information, or samples the reference electric potential Vofs also supplied by the signal outputting circuit 60 through the signal line 33 and writes the sampled video-signal voltage Vsig or the sampled reference electric potential Vofs into the signal storage capacitor 24 employed in the pixel circuit 20. The sampled video-signal voltage Vsig or the sampled reference electric potential Vofs is applied to the gate electrode of the device driving transistor 22 and held in the signal storage capacitor 24.

With the first power-supply electric potential Vccp asserted on the power-supply line 32 (that is, one of the power-supply lines 32-1 to **32-*m*) as the electric potential DS, a specific one of the electrodes of the device driving transistor 22 becomes the drain electrode whereas the other one of the electrode of the device driving transistor 22 becomes the source electrode. In the electrodes of the device driving transistor 22 functioning in this way, the device driving transistor 22 is operating in a saturated region and letting a current received from the power-supply line 32 flow to the organic EL device 21 as a driving current for driving the organic EL device 21 into a state of emitting light. To put it more concretely, the device driving transistor 22 is operating in a saturated region to supply a driving current serving as a light emission current having a magnitude according to the magnitude of the video-signal voltage Vsig stored in the signal storage capacitor 24 to the organic EL device 21. The organic EL device 21** thus emits light with a luminance according to the magnitude of the driving current in a light emission state.

When the first power-supply electric potential Vccp asserted on the power-supply line 32 (that is, one of the power-supply lines 32-1 to **32-*m*) as the electric potential DS is changed to the second power-supply electric potential Vini, the device driving transistor 22 operates as a switching transistor. When operating as a switching transistor, the specific electrode of the device driving transistor 22 becomes the source electrode whereas the other electrode of the device driving transistor 22 becomes the drain electrode. As such a switching transistor, the device driving transistor 22 stops the operation to supply the driving current to the organic EL device 21, putting the organic EL device 21 in a no-light emission state. That is, the device driving transistor 22 also has a function of a transistor for controlling transitions between the light emission and no-light emission states of the organic EL device 21**.

The device driving transistor 22 carries out a switching operation in order to set a no-light emission period for the organic EL device 21 as the period of a no-light emission state and control a duty which is defined as a ratio of the light emission period of the organic EL device 21 to the no-light emission period of the organic EL device 21. By executing such control, it is possible to reduce the amount of blurring caused by a residual image attributed to light generated by pixel circuits throughout one frame. Thus, in particular, the quality of a moving image can be made more excellent.

The reference electric potential Vofs selectively generated by the signal outputting circuit 60 and asserted on the signal line 33 is an electric potential used as a reference of the video-signal voltage Vsig representing luminance information received from the signal source. The reference electric potential Vofs is typically an electric potential representing the black level.

Either the first power-supply electric potential Vccp or the second power-supply electric potential Vini is selectively generated by the power-supply scan circuit 50 and asserted on the power-supply line 32. The first power-supply electric potential Vccp is a power-supply electric potential for providing the device driving transistor 22 with a driving current for driving the organic EL device 21 to emit light. On the other hand, the second power-supply electric potential Vini is a power-supply electric potential serving as a reversed bias which is applied to the organic EL device 21 in order to put the organic EL device 21 in a no-light emission state. The second power-supply electric potential Vini has to be lower than the reference electric potential Vofs. For example, the second power-supply electric potential Vini is lower than (Vofs−Vth) where reference notation Vth denotes the threshold voltage of a device driving transistor 22 employed in the pixel circuit 20. It is desirable to set the second power-supply electric potential Vini at an electric potential sufficiently lower than (Vofs−Vth).

Pixel Structure

Figure 3:
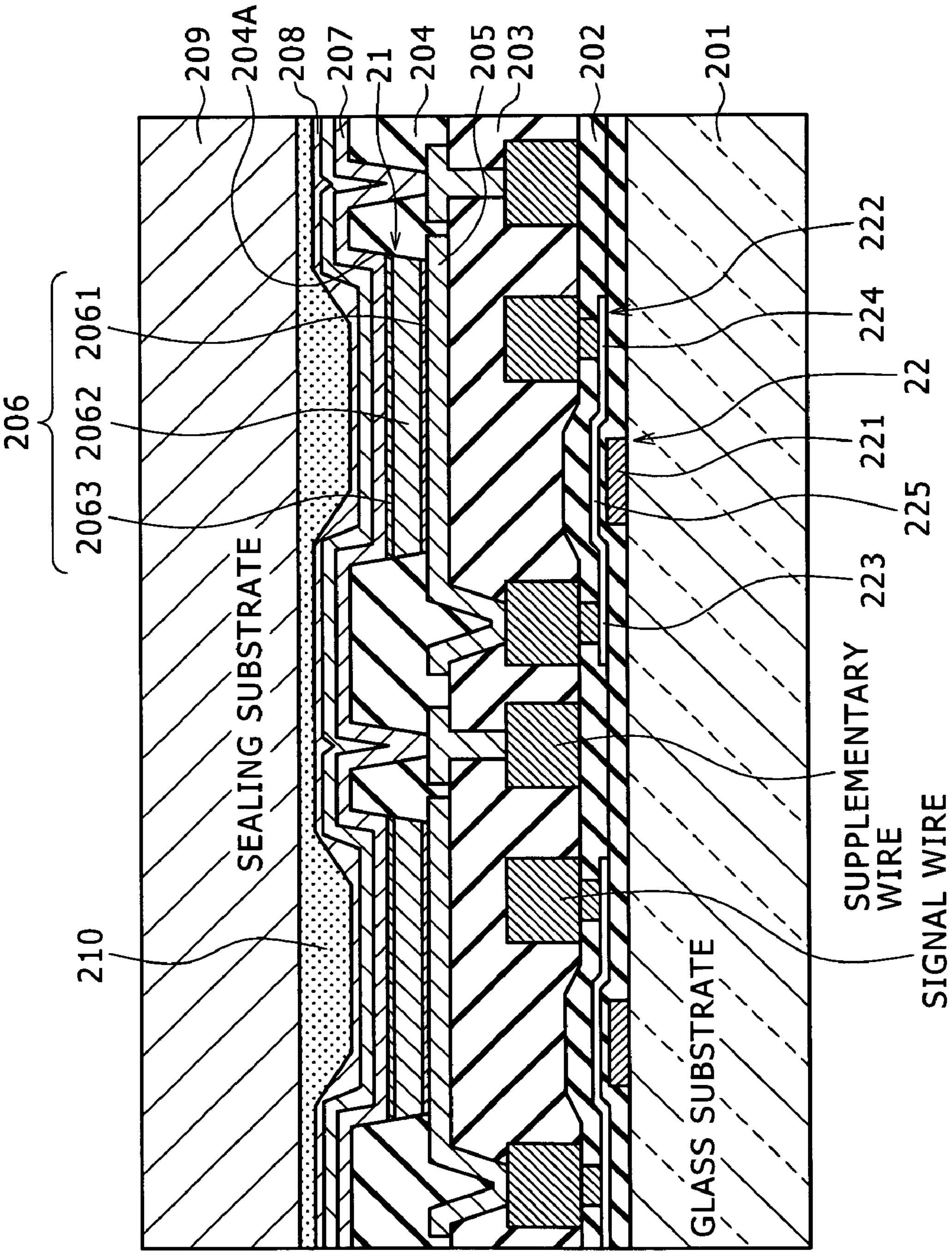
FIG. 3 is a cross-sectional diagram showing the cross section of a typical structure of the pixel circuit.

FIG. 3 is a cross-sectional diagram showing the cross section of a typical structure of the pixel circuit 20. As shown in FIG. 3, the structure of the pixel circuit 20 includes a glass substrate 201 over which driving components including the device driving transistor 22 are created. In addition, the structure of the pixel circuit 20 also includes an insulation film 202, an insulation flat film 203 and a window insulation film 204, which are sequentially created on the glass substrate 201 in an order the insulation film 202, the insulation flat film 203 and the window insulation film 204 are enumerated in this sentence. In this structure, the organic EL device 21 is provided on a dent 204A of the window insulation film 204. FIG. 3 shows merely the device driving transistor 22 of the driving circuit as a configuration element, omitting the other driving components of the driving circuit.

The organic EL device 21 has a configuration including an anode electrode 205, organic layers 206 and a cathode electrode 207. The anode electrode 205 is typically a metal created on the bottom of the dent 204A of the window insulation film 204. The organic layers 206 are an electron transport layer, a light emission layer and a hole transport/injection layer, which are created over the anode electrode 205. Placed on the organic layers 206, the cathode electrode 207 is typically a transparent conductive film created as a film common to all pixel circuits 20.

The organic layers 206 included in the organic EL device 21 are created by sequentially stacking a hole transport layer/hole injection layer 2061, a light emitting layer 2062, an electron transport layer 2063 and an electron injection layer on the anode electrode 205. It is to be noted that the electron injection layer is not shown in FIG. 3. In an operation carried out by the device driving transistor 22 to drive the organic EL device 21 to emit light by letting a current flow to the organic EL device 21 as shown in the diagram of FIG. 2, the current flows from the device driving transistor 22 to the organic layers 206 by way of the anode electrode 205. With the current flowing to the organic layers 206, holes and electrons are recombined with each other in the light emitting layer 2062, causing light to be emitted.

The device driving transistor 22 is created to have a configuration including a gate electrode 221, a semiconductor layer 222, a source/drain area 223, a drain/source area 224 and a channel creation area 225. In this configuration, the source/drain area 223 is created on one of the sides of the semiconductor layer 222 whereas the drain/source area 224 is created on the other side of the semiconductor layer 222 and the channel creation area 225 faces the gate electrode 221 of the semiconductor layer 222. The source/drain area 223 is electrically connected to the anode electrode 205 of the organic EL device 21 through a contact hole.

As shown in FIG. 3, for every pixel circuit 20, an organic EL device 21 is created over the glass substrate 201, sandwiching the insulation film 202, the insulation flat film 203 and the window insulation film 204 between the organic EL device 21 and the glass substrate 201 on which the driving components including the device driving transistor 22 are formed. After organic EL devices 21 are created in this way, a passivation film 208 is created over the organic EL devices 21 and covered by a sealing substrate 209, sandwiching an adhesive 210 between the sealing substrate 209 and the passivation film 208. In this way, the organic EL devices 21 are sealed by the sealing substrate 209, forming a display panel 70.

Circuit Operations of the Organic EL Display Apparatus

Figure 4:
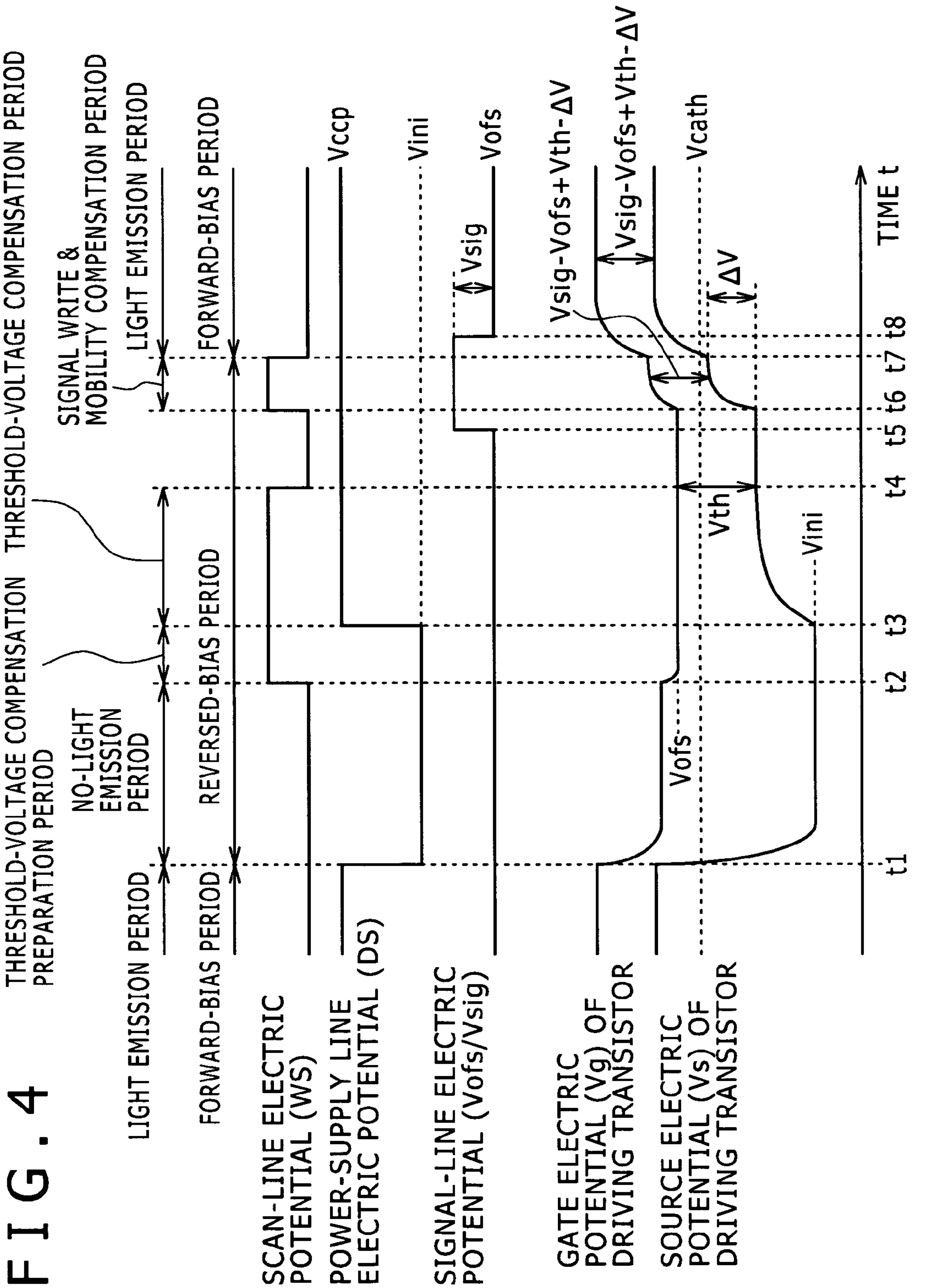
FIG. 4 is an explanatory timing/waveform diagram to be referred to in description of basic circuit operations carried out by the organic EL display apparatus.

Next, by referring to a timing/waveform diagram of FIG. 4 as a base as well as circuit diagrams of FIGS. 5 and 6, the following description explains circuit operations carried out by the active-matrix organic EL display apparatus 10 employing pixel circuits 20 laid out 2-dimensionally to form a matrix.

It is to be noted that, in the circuit-operation explanatory diagrams of FIGS. 5 and 6, the signal writing transistor 23 is shown as a symbol, which represents a switch, in order to make the diagrams simple. In addition, a capacitor 25 is shown in each of the circuit-operation explanatory diagrams of FIGS. 5 and 6 to serve as an equivalent capacitor of the organic EL device 21.

The timing/waveform diagram of FIG. 4 shows variations of an electric potential (a write scan signal) WS appearing on the scan line 31 (any one of the scan lines 31-1 to 31-*m*), variations of an electric potential DS appearing on the power-supply line 32 (any one of the power-supply lines 32-1 to 32-*m*), variations of a gate electric potential Vg appearing on the gate electrode of the device driving transistor 22 and variations of a source electric potential Vs appearing on the source electrode of the device driving transistor 22. The waveform of the gate electric potential Vg is shown by a dotted-dashed line whereas the waveform of the source electric potential Vs is shown by a dotted line so that these waveforms can be distinguished from each other.

Light Emission Period of the Preceding Frame

In the timing/waveform diagram of FIG. 4, a period prior to a time t1 is a light emission period of the organic EL device 21 in a frame (or a field) immediately preceding the present frame (or the present field). In a light emission period, the electric potential DS appearing on the power-supply line 32 is the first power-supply electric potential Vccp also referred to hereafter as a high electric potential and the signal writing transistor 23 is in a non-conductive state.

With the first power-supply electric potential Vccp asserted on the power-supply line 32 and applied to the device driving transistor 22, the device driving transistor 22 is set to operate in a saturated region. Thus, in the light emission period, a driving current (that is, a light emission current or a drain-source current Ids flowing between the drain and source electrodes of the device driving transistor 22) according to the gate-source voltage Vgs applied between the gate and source electrodes of the device driving transistor 22 flows from the power-supply line 32 to the organic EL device 21 by way of the device driving transistor 22 as shown in the circuit diagram of FIG. 5A. As a result, the organic EL device 21 emits light having a luminance proportional to the magnitude of the driving current Ids.

Threshold-Voltage Compensation Preparation Period

Then, at the time t1, a new frame (referred to as the aforementioned present frame in the timing/waveform diagram of FIG. 4) of the line-by-line sequential scan operation arrives. As shown in the circuit diagram of FIG. 5B, the electric potential DS appearing on the power-supply line 32 is changed from the high electric potential Vccp to the second power-supply electric potential Vini in order to start a threshold-voltage compensation preparation period. Also referred to hereafter as a low electric potential, typically, the low electric potential Vini is sufficiently lower than (Vofs−Vth) which is lower than Vofs where reference notation Vth denotes the threshold voltage of the device driving transistor 22 whereas reference notation Vofs denotes the aforementioned reference electric potential Vofs appearing on the signal line 33.

Let us assume that the low electric potential Vini satisfies the relation Vini<(Vthel+Vcath) where reference notation Vthel denotes the threshold voltage of the organic EL device 21 whereas reference notation Vcath denotes an electric potential appearing on the common power-supply line 34. In this case, since a source electric potential Vs appearing on the source electrode of the device driving transistor 22 is about equal to the low electric potential Vini, the organic EL device 21 is put in a reversed-bias state, ceasing to emit light.

Figure 5A:
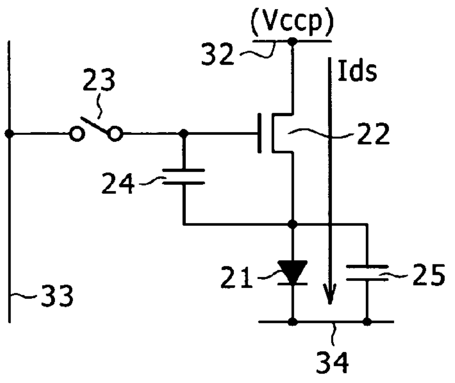
FIGS. 5A to 5D are a plurality of explanatory diagrams to be referred to in description of the first part of the basic circuit operations.
Figure 5B:
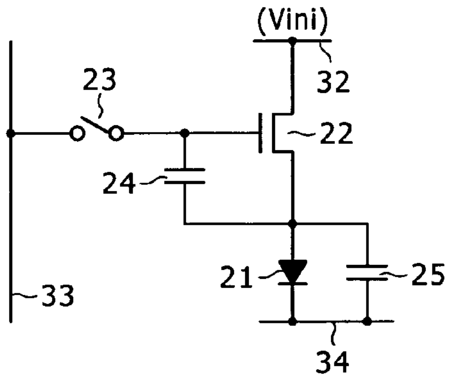
Figure 5C:
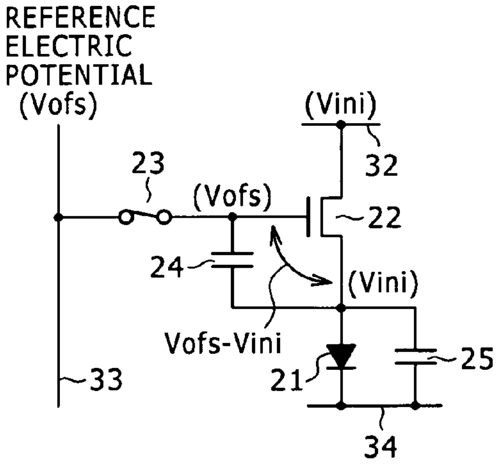

Then, at a later time t2, the electric potential WS appearing on the scan line 31 is changed from a low level to a high level, putting the signal writing transistor 23 in a conductive state to start a threshold-voltage compensation preparation period as shown in FIG. 5C. In this state, the signal outputting circuit 60 is asserting the reference electric potential Vofs on the signal line 33 and the reference electric potential Vofs is applied to the gate electrode of the device driving transistor 22 as the gate electric potential Vg by way of the signal writing transistor 23. As described above, the low electric potential Vini sufficiently lower than the reference electric potential Vofs is being supplied to the source electrode of the device driving transistor 22 as the source electric potential Vs at that time.

Thus, at that time, the gate-source voltage Vgs applied between the gate and source electrodes of the device driving transistor 22 is equal to an electric-potential difference of (Vofs−Vini). If the electric-potential difference of (Vofs−Vini) is not greater than the threshold voltage Vth of the device driving transistor 22, the threshold-voltage compensation process to be described later may not be carried out. It is thus necessary to set the low electric potential Vini and the reference electric potential Vofs at levels that satisfy the electric-potential relation (Vofs−Vini)>Vth.

The initialization process to fix (set) the electric potential Vg appearing on the gate electrode of the device driving transistor 22 at the reference electric potential Vofs and the electric potential Vs appearing on the source electrode of device driving transistor 22 at the low electric potential Vini is a process of preparation for the threshold-voltage compensation process to be described later. In the following description, the process of preparation for the threshold-voltage compensation process is referred to as a threshold-voltage compensation preparation process. In this process, the reference electric potential Vofs is an initialization electric potential of the electric potential Vg appearing on the gate electrode of the device driving transistor 22 whereas the low electric potential Vini is an initialization electric potential of the electric potential Vs appearing on the source electrode of the device driving transistor 22.

Threshold-Voltage Compensation Period

Figure 5D:
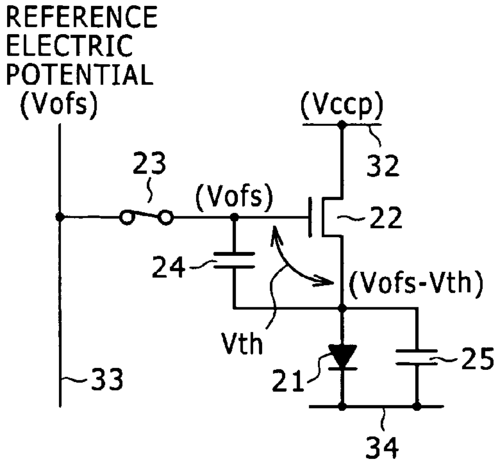

Then, when the electric potential DS appearing on the power-supply line 32 is changed from the low electric potential Vini to the high electric potential Vccp at a later time t3 as shown in FIG. 5D, in a state of sustaining the electric potential Vg appearing on the gate electrode of the device driving transistor 22 as it is, the threshold-voltage compensation period is started. That is, the electric potential Vs appearing on the source electrode of the device driving transistor 22 starts to rise toward an electric potential obtained as result of subtracting the threshold voltage Vth of the device driving transistor 22 from the gate electric potential Vg.

For the sake of convenience, the reference electric potential Vofs serving as an initialization electric potential of the electric potential Vg appearing on the gate electrode of the device driving transistor 22 as described above is taken as a reference electric potential and the process of raising the electric potential Vs to the electric potential obtained as result of subtracting the threshold voltage Vth of the device driving transistor 22 from the gate electric potential Vg is referred to as a threshold-voltage compensation process. As the threshold-voltage compensation process is going on, in due course of time, the voltage Vgs applied between the gate and source electrodes of the device driving transistor 22 is converged to the threshold voltage Vth of the device driving transistor 22, causing a voltage corresponding to the threshold voltage Vth to be stored in the signal storage capacitor 24.

It is to be noted that, in order to let the entire driving current flow to the signal storage capacitor 24 instead of flowing partially to the organic EL device 21 during the threshold-voltage compensation period in which the threshold-voltage compensation process is being carried out, the common power-supply line 34 is set at the electric potential Vcath in advance so as to put the organic EL device 21 in a cut-off state.

Figure 6A:
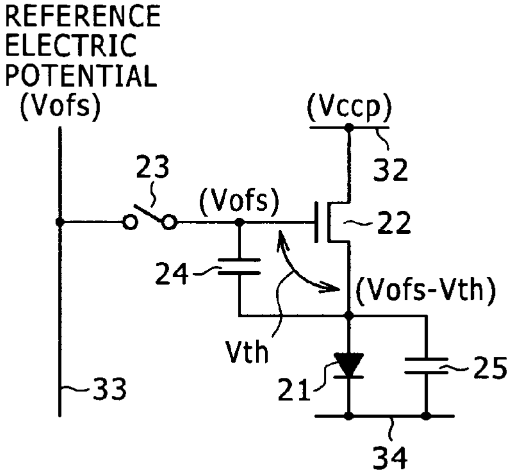
FIGS. 6A to 6D are a plurality of explanatory diagrams to be referred to in description of the second part of the basic circuit operations.

Then, at a later time t4 coinciding with the end of threshold-voltage compensation period, the electric potential WS appearing on the scan line 31 is changed to a low level in order to put the signal writing transistor 23 in a non-conductive state as shown in FIG. 6A. In this non-conductive state of the signal writing transistor 23, the gate electrode of the device driving transistor 22 is electrically disconnected from the signal line 33, entering a floating state. Since the voltage Vgs appearing between the gate and source electrodes of the device driving transistor 22 is equal to the threshold voltage Vth of the device driving transistor 22, however, the device driving transistor 22 is put in a cut-off state. Thus, the drain-source current Ids does not flow through the device driving transistor 22.

Signal Write and Mobility Compensation Period

Figure 6B:
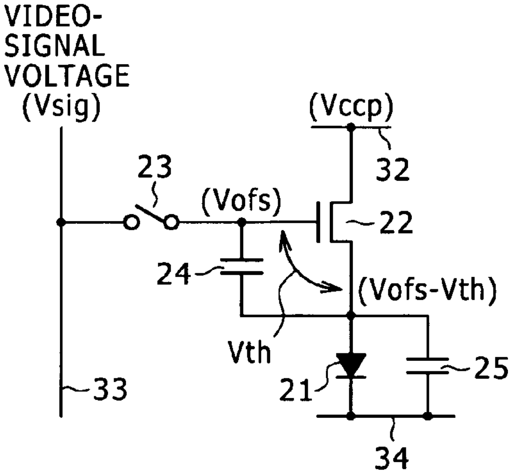
Figure 6C:
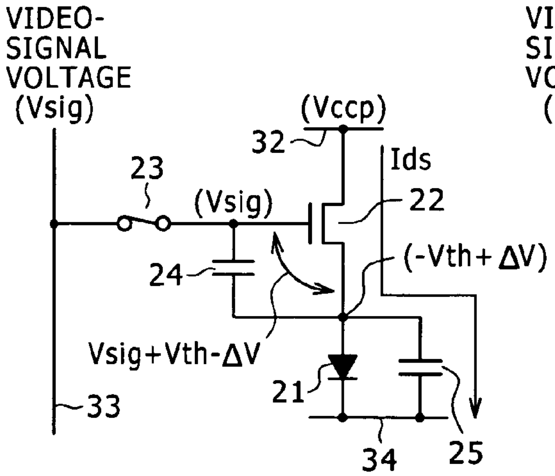

Then, at a later time t5, the electric potential appearing on the signal line 33 is changed from the reference electric potential Vofs to the video-signal voltage Vsig as shown in FIG. 6B. Subsequently, at a later time t6 coinciding with the start of the signal write and mobility compensation period, by setting the electric potential WS appearing on the scan line 31 at a high level, the signal writing transistor 23 is put in a conductive state as shown in FIG. 6C. In this state, the signal writing transistor 23 samples the video-signal voltage Vsig and stores the sampled video-signal voltage Vsig into the pixel circuit 20.

As a result of the operation carried out by the signal writing transistor 23 to store the sampled video-signal voltage Vsig into the pixel circuit 20, the electric potential Vg appearing on the gate electrode of the device driving transistor 22 becomes equal to the video-signal voltage Vsig. In the operation to drive the device driving transistor 22 by making use of the video-signal voltage Vsig, the threshold voltage Vth of the device driving transistor 22 and a voltage stored in the signal storage capacitor 24 as a voltage corresponding to the threshold voltage Vth kill each other in the so-called threshold-voltage compensation process, the principle of which will be described later in detail.

At that time, the organic EL device 21 is initially in a cut-off state (or a high-impedance state). Thus, the drain-source current Ids flowing from the power-supply line 32 to the device driving transistor 22 driven by the video-signal voltage Vsig actually goes to the aforementioned equivalent capacitor 25 connected in parallel to the organic EL device 21 instead of entering the organic EL device 21 itself. As a result, an electric charging process of the equivalent capacitor 25 is started.

While the equivalent capacitor 25 is being electrically charged, the electric potential Vs appearing on the source electrode of the device driving transistor 22 rises with the lapse of time. Since the drain-source current Ids flowing between the drain and source electrodes of the device driving transistor 22 has already been compensated for the Vth (threshold-voltage) variations from pixel to pixel, the drain-source current Ids varies from pixel to pixel merely in accordance with the mobility μ of the device driving transistor 22.

Let us assume that the write gain has an ideal value of 1. The write gain is defined as a ratio of the voltage Vgs, which is observed between the gain and source electrodes of the device driving transistor 22 and stored in the signal storage capacitor 24 as a voltage corresponding to the threshold voltage Vth of the device driving transistor 22 as described above, to the video-signal voltage Vsig. As the electric potential Vs appearing on the source electrode of the device driving transistor 22 reaches an electric potential of (Vofs−Vth+ΔV), the voltage Vgs observed between the gain and source electrodes of the device driving transistor 22 becomes equal to an electric potential of (Vsig−Vofs+Vth−ΔV) where reference notation ΔV denotes the increase in source electric potential Vs.

That is, a negative feedback operation is carried out so as to subtract the increase ΔV of the electric potential Vs appearing on the source electrode of the device driving transistor 22 from a voltage stored in the signal storage capacitor 24 as a voltage of (Vsig−Vofs+Vth) or, in other words, a negative feedback operation is carried out so as to electrically discharge some electric charge from the signal storage capacitor 24. In the negative feedback operation, the increase ΔV of the electric potential Vs appearing on the source electrode of the device driving transistor 22 is used as a negative-feedback quantity.

As described above, by negatively feeding the drain-source current Ids flowing between the drain and source electrodes of the device driving transistor 22 back to the gate input of the device driving transistor 22, that is, by negatively feeding the drain-source current Ids flowing between the drain and source electrodes of the device driving transistor 22 back to the voltage Vgs appearing between the gain and source electrodes of the device driving transistor 22, the dependence of the drain-source current Ids on the mobility μ of the device driving transistor 22 can be eliminated. That is, in the operation to sample the video-signal voltage Vsig and store the sampled video-signal voltage Vsig into the pixel circuit 20, a mobility compensation process is also carried out as well at the same time in order to compensate the drain-source current Ids flowing between the drain and source electrodes of the device driving transistor 22 for mobility (μ) variations from pixel to pixel.

To put it more concretely, the larger the amplitude Vin (=Vsig−Vofs) of the video-signal voltage Vsig to be stored in the gate electrode of the device driving transistor 22, the bigger the drain-source current Ids flowing between the drain and source electrodes of the device driving transistor 22 and, hence, the larger the absolute value of the increase ΔV used as the negative-feedback quantity (or the compensation quantity) of the negative feedback operation. Thus, it is possible to carry out a mobility compensation process according to the level of the luminance of light emitted by the organic EL device 21.

For a fixed amplitude Vin of the video-signal voltage Vsig, the larger the mobility μ of the device driving transistor 22, the bigger the absolute value of the increase ΔV used as the negative-feedback quantity (or the compensation quantity) of the negative feedback operation. It is thus possible to compensate the drain-source current Ids flowing between the drain and source electrodes of the device driving transistor 22 for mobility (μ) variations from pixel to pixel. The principle of the mobility compensation process will be described later in detail.

Light Emission Period

Figure 6D:
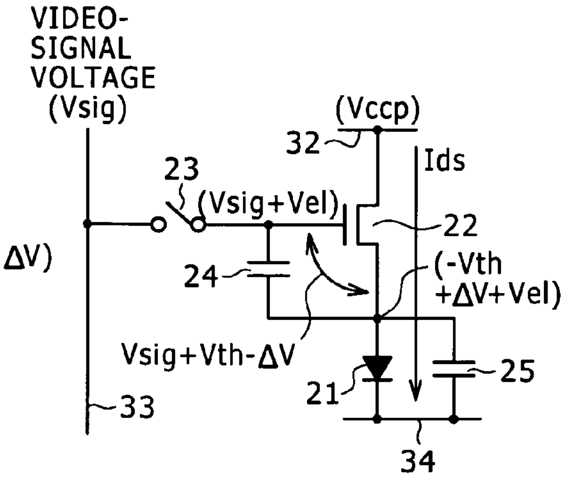

Then, at a later time t7 coinciding with the end of the signal write and mobility compensation period or the start of a light emission period, the electric potential WS appearing on the scan line 31 is changed to a low level in order to put the signal writing transistor 23 in a non-conductive state as shown in FIG. 6D. With the electric potential WS put at a low level, the gate electrode of the device driving transistor 22 is electrically disconnected from the signal line 33, entering a floating state.

With the gate electrode of the device driving transistor 22 put in a floating state and with the gate as well as source electrodes of the device driving transistor 22 connected to the signal storage capacitor 24, when the electric potential Vs appearing on the source electrode of the device driving transistor 22 varies in accordance with the amount of electrical charge stored in the signal storage capacitor 24, the electric potential Vg appearing on the gate electrode of the device driving transistor 22 also varies in a manner of being interlocked with the variation of the electric potential Vs. The operation in which the electric potential Vg appearing on the gate electrode of the device driving transistor 22 also varies in a manner of being interlocked with the variation of the electric potential Vs appearing on the source electrode of the device driving transistor 22 is referred to as a bootstrap operation which is based on a coupling effect provided by the signal storage capacitor 24.

At the time the gate electrode of the device driving transistor 22 is put in a floating state, the drain-source current Ids flowing between the drain and source electrodes of the device driving transistor 22 starts to flow to the organic EL device 21. Thus, an electric potential appearing on the anode electrode of the organic EL device 21 rises in accordance with an increase in drain-source current Ids.

As the electric potential appearing on the anode electrode of the organic EL device 21 exceeds an electric potential of (Vthel+Vcath), a driving current (or a light emission current) starts to flow through the organic EL device 21, causing the organic EL device 21 to begin emitting light. The increase of the electric potential appearing on the anode electrode of the organic EL device 21 is no other than the increase of the electric potential Vs appearing on the source electrode of the device driving transistor 22. When of the electric potential Vs appearing on the source electrode of the device driving transistor 22 rises, in the bootstrap operation based on the coupling effect provided by the signal storage capacitor 24, the electric potential Vg appearing on the gate electrode of the device driving transistor 22 also rises in a manner of being interlocked with the variation of the electric potential Vs appearing on the source electrode of the device driving transistor 22.

Let us assume that a bootstrap gain of the bootstrap operation has an ideal value of 1. The bootstrap gain of the bootstrap operation is defined as the ratio of the increase of the electric potential Vg appearing on the gate electrode of the device driving transistor 22 to the increase of the electric potential Vs appearing on the source electrode of the device driving transistor 22. With the bootstrap gain of the bootstrap operation assumed to have an ideal value of 1, the increase of the electric potential Vg appearing on the gate electrode of the device driving transistor 22 is equal to the increase of the electric potential Vs appearing on the source electrode of the device driving transistor 22. Therefore, during a light emission period, the gate-source voltage Vgs applied between the gate and source electrodes of the device driving transistor 22 is sustained at a fixed level of (Vsig−Vofs+Vth−ΔV). Then, at a later time t8, the video-signal voltage Vsig asserted on the signal line 33 is changed to the reference electric potential Vofs.

In the series of operations described above, various kinds of processing including the threshold-voltage compensation preparation process, the threshold-voltage compensation process, the signal writing operation to store the video-signal voltage Vsig into the signal storage capacitor 24 and the mobility compensation process are carried out in one horizontal scan period referred to as 1H. The signal writing operation to store the video-signal voltage Vsig into the signal storage capacitor 24 and the mobility compensation process are carried out concurrently at the same time during a period between the times t6 and t7.

Principle of the Threshold-Voltage Compensation Process

The following description explains the principle of the threshold-voltage compensation process carried out in the threshold-voltage compensation period between the times t3 and t4, which are described earlier by referring to the timing/waveform diagram of FIG. 4, in order to compensate the drain-source current Ids flowing between the drain and source electrodes of the device driving transistor 22 for variations of the threshold voltage Vth of the device driving transistor 22 from pixel to pixel. As described before, the device driving transistor 22 is designed to operate in a saturated region with the first power-supply electric potential Vccp asserted on the power-supply line 32 and applied to the device driving transistor 22 in the threshold-voltage compensation period between the times t3 and t4 as shown in the circuit diagrams of FIGS. 5D and 6A. Thus, the device driving transistor 22 works as a constant-current source. As a result, the device driving transistor 22 supplies a constant drain-source current Ids (also referred to as a driving current or a light emission current) given by Eq. (1) to the organic EL device 21.

$$Ids=(1/2)\cdot\mu(W/L)Cox(Vgs-Vth)^2 \quad (1)$$

In the above equation, reference notation W denotes the width of the channel of the device driving transistor 22, reference notation L denotes the length of the channel and reference notation Cox denotes a gate capacitance per unit area.

Figure 7:
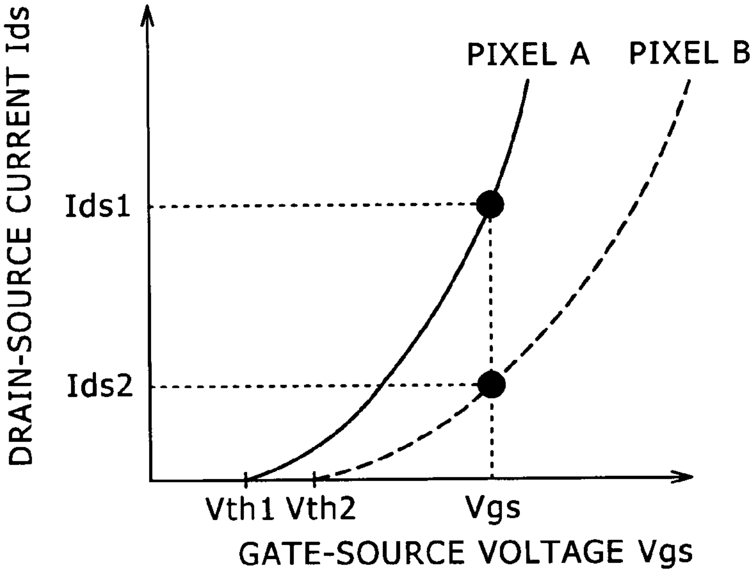
FIG. 7 is a characteristic diagram showing curves each representing a current-voltage characteristic expressing a relation between the drain-source current Ids flowing between the drain and source electrodes of a device driving transistor and the gate-source voltage Vgs applied between the gate and source electrodes of the device driving transistor as curves used for explaining variations in threshold voltage Vth from transistor to transistor.

FIG. 7 is a characteristic diagram showing curves each representing a current-voltage characteristic expressing a relation between the drain-source current Ids flowing between the drain and source electrodes of the device driving transistor 22 and the gate-source voltage Vgs applied between the gate and source electrodes of the device driving transistor 22.

A solid line in the characteristic diagram of FIG. 7 represents a characteristic for pixel circuit A having a device driving transistor 22 with a threshold voltage Vth1 whereas a dashed line in the same characteristic diagram represents a characteristic for pixel circuit B having a device driving transistor 22 with a threshold voltage Vth2 different from the threshold voltage Vth1. As is obvious from the characteristic diagram of FIG. 7, for the same magnitude of the gate-source voltage Vgs represented by the horizontal axis, the drain-source current Ids flowing between the drain and source electrodes of the device driving transistor 22 employed in pixel circuit A is Ids1 whereas the drain-source current Ids flowing between the drain and source electrodes of the device driving transistor 22 employed in pixel circuit B is Ids2 different from the drain-source current Ids1 unless a threshold-voltage compensation process is carried out to compensate the drain-source current Ids flowing between the drain and source electrodes of the device driving transistor 22 for variations in Vth from pixel to pixel where reference notation Vth denotes the threshold voltage of the device driving transistor 22.

In the example shown in the characteristic diagram of FIG. 7, the threshold voltage Vth2 of the device driving transistor 22 employed in pixel circuit B is greater than the threshold voltage Vth1 of the device driving transistor 22 employed in pixel circuit A, that is, Vth2>Vth1. In this case, for the same magnitude of the gate-source voltage Vgs represented by the horizontal axis, the drain-source current Ids flowing between the drain and source electrodes of the device driving transistor 22 employed in pixel circuit A is Ids1 whereas the drain-source current Ids flowing between the drain and source electrodes of the device driving transistor 22 employed in pixel circuit B is Ids2 which smaller than the drain-source current Ids1, that is, Ids2<Ids1. That is, even for the same magnitude of the gate-source voltage Vgs represented by the horizontal axis, if the threshold voltage Vth of the device driving transistor 22 varies from pixel to pixel, the drain-source current Ids flowing between the drain and source electrodes of the drain-source current also varies from pixel to pixel as well.

In the pixel circuit 20 having the configuration described above, on the other hand, the gate-source voltage Vgs applied between the gate and source electrodes of the device driving transistor 22 at a light emission time is equal to (Vsig−Vofs+Vth−ΔV) as described before. By substituting the expression (Vsig−Vofs+Vth−ΔV) into Eq. (1) to serve as a replacement of the term Vgs, the drain-source current Ids can be expressed by Eq. (2) as follows:

$$Ids=(1/2)\cdot\mu(W/L)Cox(Vsig-Vofs-\Delta V)^2 \tag{2}$$

That is, the term Vth representing the threshold voltage of the device driving transistor 22 disappears from the expression on the right-hand side of Eq. (2). In other words, the drain-source current Ids flowing from the device driving transistor 22 to the organic EL device 21 is no longer dependent on the threshold voltage Vth of the device driving transistor 22. As a result, even if the threshold voltage Vth of the device driving transistor 22 varies from pixel to pixel due to variations in process of manufacturing the device driving transistor 22 or due to the time degradation, the drain-source current Ids does not vary from pixel to pixel provided that the same gate-source voltage Vgs represented by the horizontal axis is applied to the gate electrodes of the device driving transistors 22 employed in the pixel circuits. Thus, it is possible to sustain the luminance of light emitted by each of organic EL devices 21 at the same value if the same gate-source voltage Vgs representing the same video-signal voltage Vsig is applied to the gate electrodes of the device driving transistors 22 employed in the pixel circuits 20 each including one of the organic EL devices 21.

Principle of the Mobility Compensation Process

Figure 8:
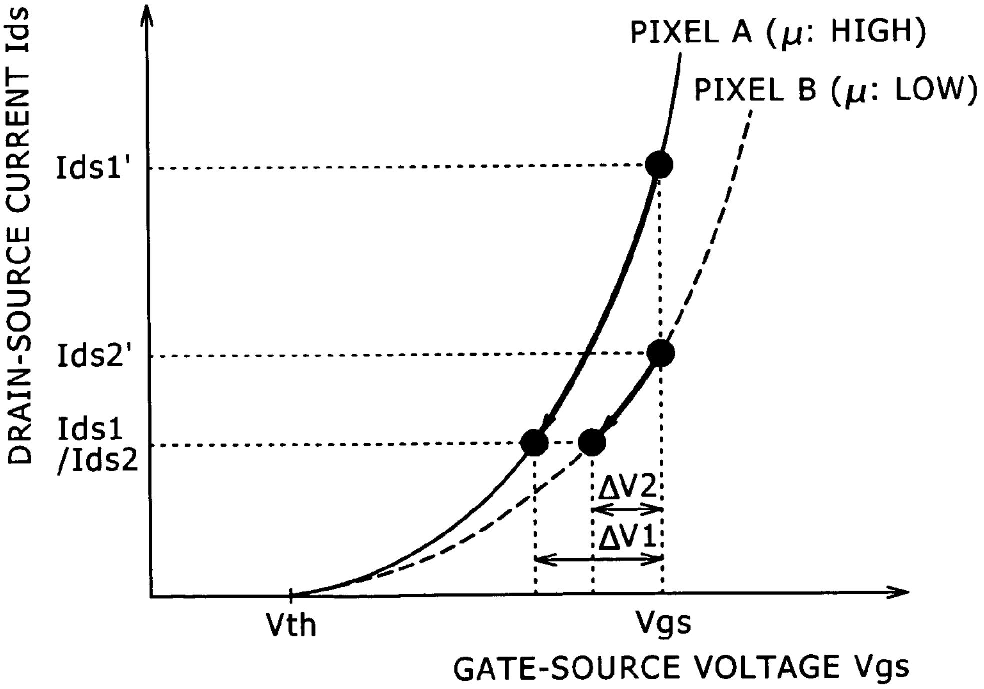
FIG. 8 is a characteristic diagram showing curves each representing a current-voltage characteristic expressing a relation between the drain-source current Ids flowing between the drain and source electrodes of a device driving transistor and the gate-source voltage Vgs applied between the gate and source electrodes of the device driving transistor as curves used for explaining variations in mobility $\mu$ from transistor to transistor.

The following description explains the principle of the mobility compensation process carried out to compensate the drain-source current Ids flowing between the drain and source electrodes of the device driving transistor 22 for variations of the mobility of the device driving transistor 22 from pixel to pixel. FIG. 8 is also a characteristic diagram showing curves each representing a current-voltage characteristic expressing a relation between the drain-source current Ids flowing between the drain and source electrodes of the device driving transistor 22 and the gate-source voltage Vgs applied between the gate and source electrodes of the device driving transistor 22. A solid line in the characteristic diagram of FIG. 8 represents a characteristic for pixel circuit A having a device driving transistor 22 with a relatively large mobility μ whereas a dashed line in the same characteristic diagram represents a characteristic for pixel circuit B having a device driving transistor 22 with a relatively small mobility μ even though the device driving transistor 22 employed in pixel circuit A has a threshold voltage Vth equal to the threshold voltage Vth of the device driving transistor 22 employed in pixel circuit A. As is obvious from the characteristic diagram of FIG. 8, for the same magnitude of the gate-source voltage Vgs represented by the horizontal axis, the drain-source current Ids flowing between the drain and source electrodes of the device driving transistor 22 employed in pixel circuit A is Ids1' whereas the drain-source current Ids flowing between the drain and source electrodes of the device driving transistor 22 employed in pixel circuit B is Ids2' different from the drain-source current Ids1' unless a mobility compensation process is carried out to compensate the drain-source current Ids flowing between the drain and source electrodes of the device driving transistor 22 for the mobility variations from pixel to pixel. If a polysilicon thin film transistor or the like is employed in the pixel circuit 20 as the device driving transistor 22, variations in mobility μ from pixel to pixel such as the differences in mobility μ between pixel circuits A and B may not be avoided.

With the existing differences in mobility μ between pixel circuits A and B, even if the same gate-source voltage Vgs representing the same video-signal voltage Vsig is applied to the gate electrodes of the device driving transistors 22 employed in pixel circuit A employing a device driving transistor 22 with a relatively large mobility μ and pixel circuit B employing a device driving transistor 22 with a relatively small mobility μ, the drain-source current Ids flowing between the drain and source electrodes of the device driving transistor 22 employed in pixel circuit A is Ids1' whereas the drain-source current Ids flowing between the drain and source electrodes of the device driving transistor 22 employed in pixel circuit B is Ids2' much different from the drain-source current Ids1' unless a mobility compensation process is carried out to compensate the drain-source current Ids flowing between the drain and source electrodes of the device driving transistor 22 for the differences in mobility μ between pixel circuits A and B. If such a large Ids difference is caused by variations in μ from pixel to pixel as a difference in drain-source current Ids between the device driving transistors 22 where reference notation μ denotes the mobility of the device driving transistor 22, the uniformity of the screen is lost.

As is obvious from Eq. (1) given earlier as an equation expressing the characteristic of the device driving transistor 22, the larger the mobility μ of a device driving transistor 22, the larger the drain-source current Ids flowing between the drain and source electrodes of the device driving transistor 22. Since the feedback quantity ΔV of the negative feedback operation is proportional to the drain-source current Ids flowing between the drain and source electrodes of the device driving transistor 22, the larger the mobility μ of a device driving transistor 22, the larger the feedback quantity ΔV of the negative feedback operation. As shown in the characteristic diagram of FIG. 8, the feedback quantity ΔV1 of pixel circuit A employing a device driving transistor 22 with a relatively large mobility μ is greater than the feedback quantity ΔV2 of pixel circuit B employing a device driving transistor 22 with a relatively small mobility μ.

The mobility compensation process is carried out by negatively feeding the drain-source current Ids flowing between the drain and source electrodes of the device driving transistor 22 back to the Vsig side where reference notation Vsig denotes the voltage of the video signal. In this negative feedback operation, the larger the mobility μ of a device driving transistor 22, the higher the degree at which the negative feedback operation is carried out. As a result, it is possible to eliminate the variations in μ from pixel to pixel where reference notation μ denotes the mobility of the device driving transistor 22.

To put it concretely, if the compensation-quantity ΔV1 is taken as the feedback quantity ΔV1 in the negative feedback operation of the mobility compensation process carried out on pixel circuit A employing a device driving transistor 22 with a relatively large mobility μ, the drain-source current Ids flowing between the drain and source electrodes of the device driving transistor 22 employed in pixel circuit A is greatly reduced from Ids1' to Ids1. If the compensation quantity ΔV2 smaller than the compensation quantity ΔV1 is taken as the feedback quantity ΔV2 in the negative feedback operation of the mobility compensation process carried out on pixel circuit B employing a device driving transistor 22 with a relatively small mobility μ, on the other hand, in comparison with pixel circuit A, the drain-source current Ids flowing between the drain and source electrodes of the device driving transistor 22 employed in pixel circuit B is slightly reduced from Ids2' to Ids2 which is all but equal to the drain-source current Ids1. As a result, since Ids1 representing the drain-source current Ids flowing between the drain and source electrodes of the device driving transistor 22 employed in pixel circuit A is all but equal to Ids2 representing the drain-source current Ids flowing between the drain and source electrodes of the device driving transistor 22 employed in pixel circuit B, it is possible to compensate the drain-source current Ids flowing between the drain and source electrodes of the device driving transistor 22 for the variations of the mobility of the device driving transistor 22 from pixel to pixel.

What has been described above is summarized as follows. The feedback quantity ΔV1 taken in the negative feedback operation carried out as the mobility compensation process on pixel circuit A employing a device driving transistor 22 with a relatively large mobility μ is large in comparison with the feedback quantity ΔV2 taken in the negative feedback operation of the mobility compensation process carried out on pixel circuit B employing a device driving transistor 22 with a relatively small mobility μ. That is, the larger the mobility μ of a device driving transistor 22, the larger the feedback quantity ΔV of the negative feedback operation carried out on a pixel circuit employing the device driving transistor 22 and, hence, the larger the decrease in drain-source current Ids flowing between the drain and source electrodes of the device driving transistor 22.

Thus, by negatively feeding the drain-source current Ids flowing between the drain and source electrodes of the device driving transistor 22 back to the gate-electrode side provided with the video-signal voltage Vsig as the gate-electrode side of the device driving transistor 22, the magnitudes of the drain-source currents Ids following through device driving transistors 22 employed in pixel circuits as device driving transistors 22 having different values of the mobility μ can be averaged. As a result, it is possible to compensate the drain-source current Ids flowing between the drain and source electrodes of the device driving transistor 22 for variations of the mobility of the device driving transistor 22 from pixel to pixel. That is, the negative-feedback operation of negatively feeding the magnitude of the drain-source current Ids flowing between the drain and source electrodes of the device driving transistor 22 back to the gate-electrode side of the device driving transistor 22 is the mobility compensation process.

FIG. 9 is a plurality of diagrams each showing relations between the video-signal voltage Vsig (or the sampled electric potential) and the drain-source current Ids flowing between the drain and source electrodes of the device driving transistor 22 employed in the pixel circuit 20 included in the active-matrix organic EL display apparatus 10 shown in the block diagram of FIG. 2. The diagrams show such relations for a variety of driving methods carried out with or without the threshold-voltage compensation process and with or without the mobility compensation process.

Figure 9A:
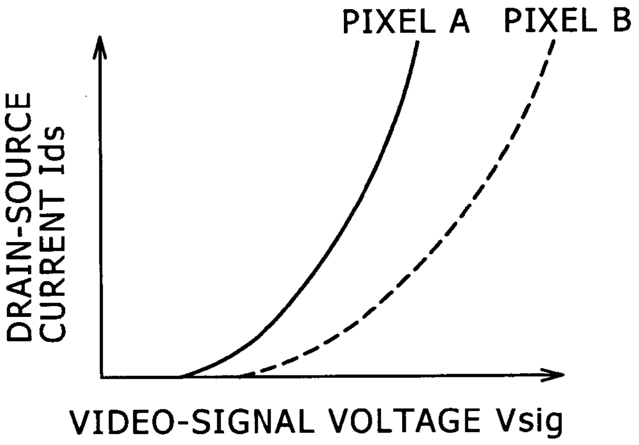
FIGS. 9A to 9C are a plurality of diagrams each showing relations between a video-signal voltage Vsig and a drain-source current Ids flowing between the drain and source electrodes of a device driving transistor for a variety of cases.
Figure 9B:
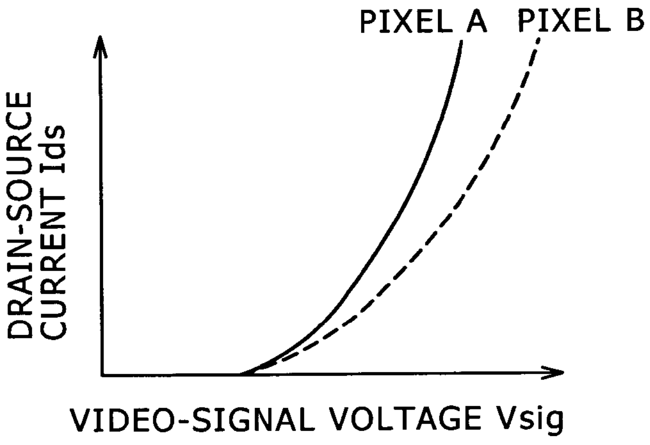
Figure 9C:
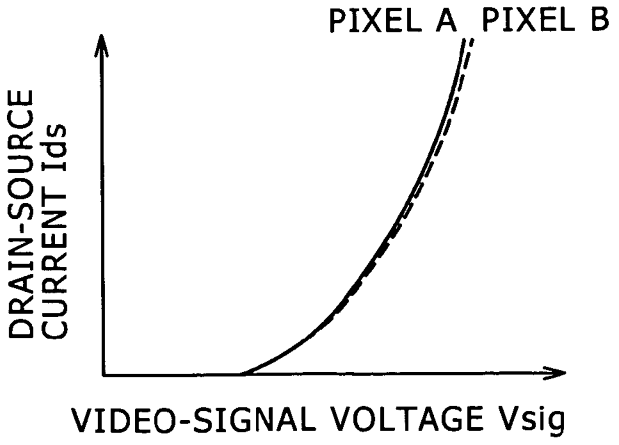

To be more specific, FIG. 9A is a diagram showing two curves each representing a relation between the video-signal voltage Vsig and the drain-source current Ids flowing between the drain and source electrodes of the device driving transistor 22 for respectively different pixel circuits A and B which are subjected to neither the threshold-voltage compensation process nor the mobility compensation process. FIG. 9B is a diagram showing two curves each representing a relation between the video-signal voltage Vsig and the drain-source current Ids flowing between the drain and source electrodes of the device driving transistor 22 for respectively different pixel circuits A and B which are subjected to the threshold-voltage compensation process but not subjected to the mobility compensation process. FIG. 9C is a diagram showing two curves each representing a relation between the video-signal voltage Vsig and the drain-source current Ids flowing between the drain and source electrodes of the device driving transistor 22 for respectively different pixel circuits A and B which are subjected to both the threshold-voltage compensation process and the mobility compensation process.

As shown by the curves of FIG. 9A given for a case in which pixel circuits A and B are subjected to neither the threshold-voltage compensation process nor the mobility compensation process, for the same magnitude of the gate-source voltage Vgs represented by the horizontal axis, a big difference in drain-source current Ids between pixel circuits A and B having different threshold voltages Vth and different values of the mobility μ is observed as a difference caused by the different threshold voltages Vth and the different values of the mobility μ.

As shown by the curves of FIG. 9B given for a case in which pixel circuits A and B are subjected to the threshold-voltage compensation process but not subjected to the mobility compensation process, on the other hand, for the same magnitude of the gate-source voltage Vgs represented by the horizontal axis, a smaller difference in drain-source current Ids between pixel circuits A and B having different threshold voltages Vth and different values of the mobility μ is observed as a difference caused by the different threshold voltages Vth and the different values of the mobility μ. Even though the difference is reduced to a certain degree from the difference for the case shown by the curves of FIG. 9A, the difference still remains.

As shown by the curves of FIG. 9C given for a case in which pixel circuits A and B are subjected to both the threshold-voltage compensation process and the mobility compensation process, for the same magnitude of the gate-source voltage Vgs represented by the horizontal axis, all but no difference in drain-source current Ids between pixel circuits A and B having different threshold voltages Vth and different values of the mobility μ is observed as a difference caused by the different threshold voltages Vth and the different values of the mobility μ. Thus, there are no variations of the luminance of light emitted by the organic EL device 21 from pixel to pixel for every gradation. As a result, it is possible to display an image having a high quality.

In addition, besides the threshold-voltage and mobility compensation functions, the pixel circuit 20 included in the active-matrix organic EL display apparatus 10 shown in FIG. 2 also has a bootstrap-operation function based on the coupling effect provided by the signal storage capacitor 24 as described previously so that the pixel circuit 20 is capable of exhibiting an effect described as follows.

Even if the electric potential Vs appearing on the source electrode of the device driving transistor 22 changes because the I-V characteristic of the organic EL device 21 deteriorates with the lapse of time in a time degradation process, the bootstrap operation based on the coupling effect provided by the signal storage capacitor 24 allows the gate-source voltage Vgs applied between the gate and source electrodes of the device driving transistor 22 to be sustained at a fixed level so that the driving current flowing through the organic EL device 21 also does not change with the lapse of time in a time degradation process. Thus, since the luminance of light emitted by the organic EL device 21 also does not vary with the lapse of time in a time degradation process, it is possible to display images with no deteriorations accompanying the time degradation of the I-V characteristic of the organic EL device 21 even if the I-V characteristic worsens with the lapse of time in a time degradation process.

Stress Generated in the Organic EL Device During the No-Light Emission Period

As is obvious from the above description of the operations carried out by the pixel circuit 20, during the no-light emission period of the organic EL device 21 between the times t1 and t2, the electric potential DS asserted on the power-supply line 32 is switched to the second power-supply electric potential Vini, putting the organic EL device 21 in a reversed-bias state. With the organic EL device 21 put in a reversed-bias state, the organic EL device 21 does not emit light, hence, entering a no-light emission state with a high degree of reliability.

If the organic EL device 21 is put in a reversed-bias state, however, electrical stress is developed in the organic EL device 21. In addition, if the period during which the electrical stress is developed in the organic EL device 21 is long, the characteristics of the organic EL device 21 change or the organic EL device 21 becomes defective in a state of being incapable of emitting light due to the stress as explained before. As a result, the quality of the displayed image deteriorates. The light-emission defect of an organic EL device 21 is a defect making the organic EL device 21 incapable of emitting light.

Embodiments

In order to solve the problem described above, an embodiment of the present invention implements an operation to drive the pixel circuit 20 by generating no electrical stress in the organic EL device 21 during a portion of the no-light emission period of the organic EL device 21. This driving operation is carried out in accordance with control executed by the power-supply scan circuit 50 which serves as a power-supply section. The following description concretely explains a driving method that does not develop electrical stress in the organic EL device 21.

Figure 10:
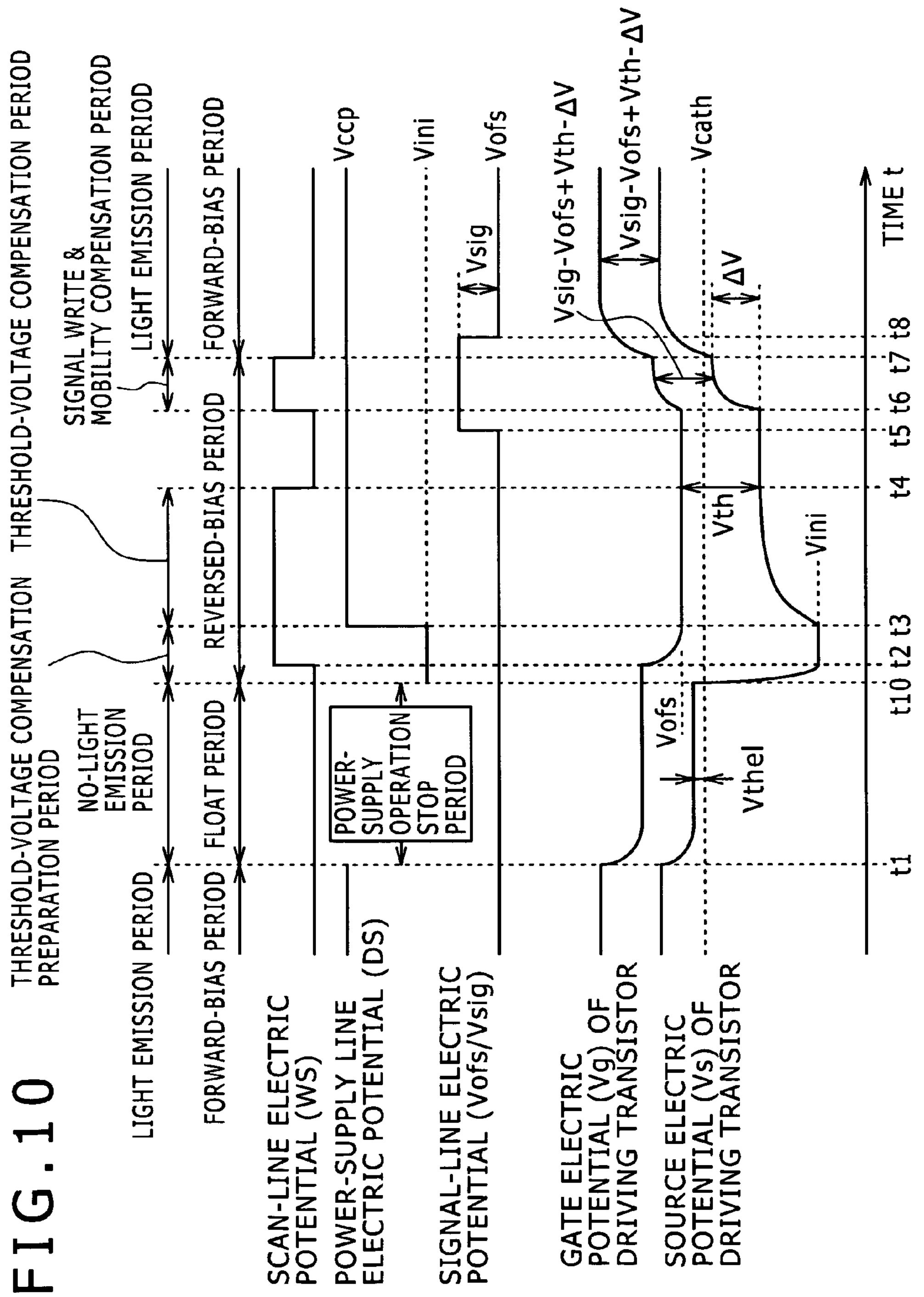
FIG. 10 is a timing/waveform diagram to be referred to in explanation of circuit operations carried out by the pixel circuit employed in an organic EL display apparatus according to the embodiment of the present invention.

FIG. 10 is a timing/waveform diagram referred to in explanation of operations carried out by the pixel circuit 20 employed in an organic EL display apparatus according to the embodiment of the present invention. As shown in this timing/waveform diagram, in a portion of the no-light emission period of the organic EL device 21, the power-supply scan circuit 50 stops the operation to assert the electric potential DS on the power-supply line 32. The aforementioned portion of the no-light emission period of the organic EL device 21 is the early part of the no-light emission period. That is, the portion of the no-light emission period of the organic EL device 21 is a portion immediately leading ahead of the process of initializing the source electric potential Vs appearing on the source electrode of the device driving transistor 22 to the second power-supply electric potential Vini. As described earlier, the source electrode of the device driving transistor 22 is the electrode on a side opposite to the power-supply line 32 with respect to the device driving transistor 22. To put it concretely, the portion of the no-light emission period of the organic EL device 21 is a period between the times t1 and t10 shown in FIG. 10.

Figure 11:
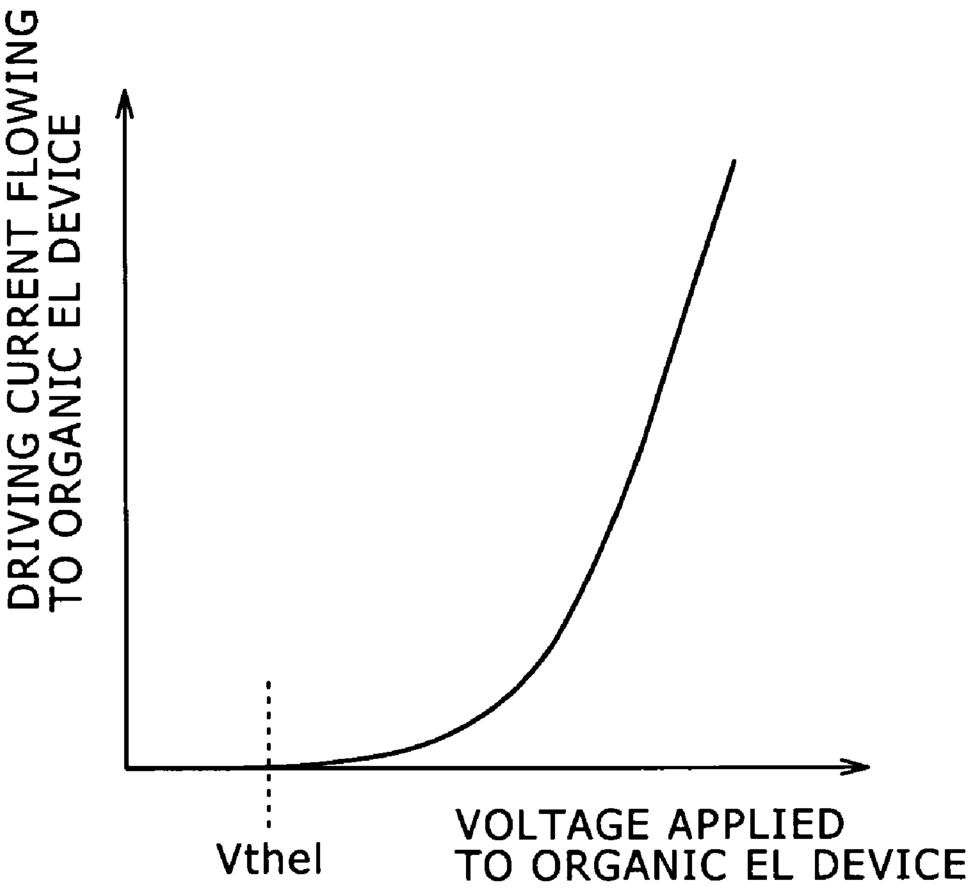
FIG. 11 is a diagram showing a characteristic representing the relation between the voltage applied to an organic EL device and the driving current flowing through the organic EL device.

As described above, in the portion of the no-light emission period of the organic EL device 21, the power-supply scan circuit 50 stops the operation to assert the electric potential DS on the power-supply line 32, putting the power-supply line 32 in a floating state. Thus, serving as an electrode connected to the power-supply line 32, the drain electrode of the device driving transistor 22 is also put in a floating state as well. FIG. 11 is a diagram showing a characteristic representing the relation between the voltage applied to the organic EL device 21 and the driving current flowing through the organic EL device 21. As shown in this diagram, the driving current starts to flow through the organic EL device 21 when the voltage applied to the organic EL device 21 exceeds the threshold voltage Vthel of the organic EL device 21.

Thus, when the power-supply scan circuit 50 stops the operation to assert the electric potential DS on the power-supply line 32 during the portion of the no-light emission period of the organic EL device 21, the source electric potential Vs of the device driving transistor 22 is equal to Vthel+Vcath. Accordingly, during the portion of the no-light emission period of the organic EL device 21, no reversed bias is applied to the organic EL device 21. As a result, a period in which a reversed bias is being applied to the device driving transistor 22 is extremely short in comparison with a configuration in which the power-supply scan circuit 50 does not stop the operation to assert the electric potential DS on the power-supply line 32. Accordingly, it is possible to reduce the amount of electrical stress which is developed in the organic EL device 21 due to a reversed bias applied to the organic EL device 21. Therefore, it is possible to prevent the characteristics of the organic EL device 21 from changing and the organic EL device 21 from becoming defective in a state of being incapable of emitting light due to electrical stress which is developed in the organic EL device 21 by a reversed bias applied to the organic EL device 21. As a result, the quality of the displayed image can be improved.

Power-Supply Scan Circuit

Next, the following description explains the concrete configuration of the power-supply scan circuit 50 which stops the operation to assert the electric potential DS on the power-supply line 32 during the portion of the no-light emission period of the organic EL device 21.

First Embodiment

Figure 12:
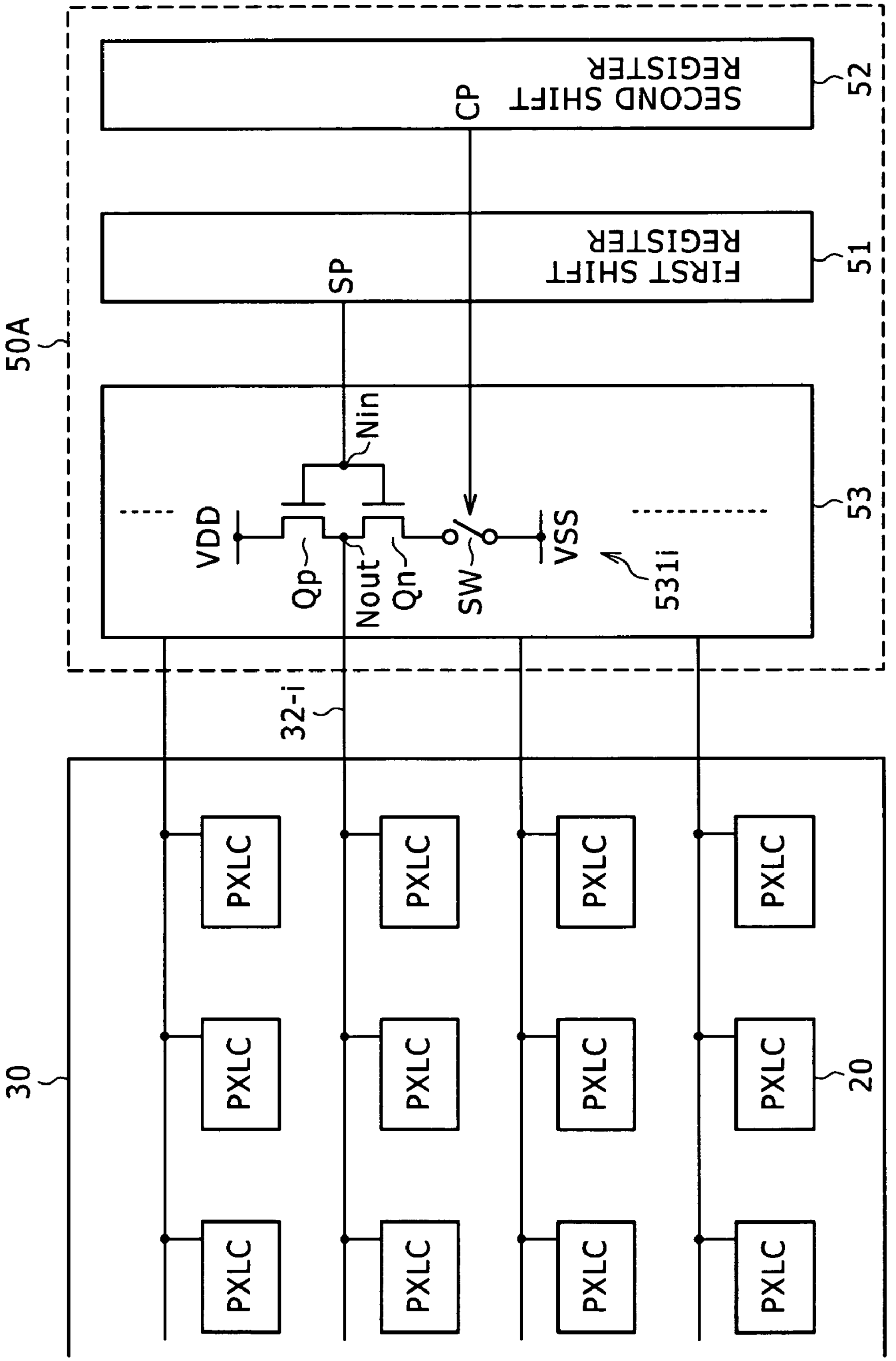
FIG. 12 is a block diagram showing the configurations of a pixel matrix section and a power-supply scan circuit according to a first embodiment of the present invention.

FIG. 12 is a block diagram showing the configurations of the pixel matrix section 30 and a power-supply scan circuit 50A according to a first embodiment of the present invention. As shown in this block diagram, the power-supply scan circuit 50A according to the first embodiment has a configuration including a first shift register 51, a second shift register 52 and an output section 53.

The first shift register 51 is a section configured to output a scan pulse SP for changing the electric potential DS synchronously with a vertical scan operation carried out by the write scan circuit 40 shown in the block diagram of FIG. 1 as a write scan operation. The second shift register 52 is a section configured to output a control pulse CP for controlling the operation to stop the assertion of the electric potential DS on the power-supply line 32 synchronously with a scan operation carried out by the first shift register 51.

The output section 53 has a configuration employing as many buffers 531 as pixel rows of the pixel matrix section 30. The block diagram of FIG. 12 shows merely a buffer 531*i* for the pixel row i as a representative of the buffers 531 of all the pixel rows. In addition, the buffer 531*i* has a single-stage configuration. In actuality, however, it is needless to say that the buffer 531*i* can have a multi-stage configuration.

The buffer 531*i* has a configuration employing a P-channel MOS transistor Qp, an N-channel MOS transistor Qn and a switch device SW. The gate electrodes of the P-channel MOS transistor Qp and the N-channel MOS transistor Qn are connected to each other through an input node Nin. By the same token, the drain electrodes of the P-channel MOS transistor Qp and the N-channel MOS transistor Qn are also connected to each other through an output node Nout. A specific one of the terminals of the switch device SW is connected to the source electrode of the N-channel MOS transistor Qn. The source electrode of the P-channel MOS transistor Qp is connected to a power-supply line which conveys a positive-side power-supply electric potential VDD whereas the other terminal of the switch device SW is connected to a power-supply line which conveys a negative-side power-supply electric potential VSS.

The input node Nin connecting the gate electrodes of the P-channel MOS transistor Qp and the N-channel MOS transistor Qn to each other serves as the input node of the buffer 531*i*. The first shift register 51 supplies the scan pulse SP to the input node Nin. By the same token, the output node Nout connecting the drain electrodes of the P-channel MOS transistor Qp and the N-channel MOS transistor Qn to each other serves as the output node of the buffer 531*i*. The output node Nout is connected to one end of the power-supply line 32-*i* for the ith pixel row. The control pulse CP generated by the second shift register 52 controls an operation to put the switch device SW in a turned-on (closed) state or a turned-off (opened) state.

Figure 13:
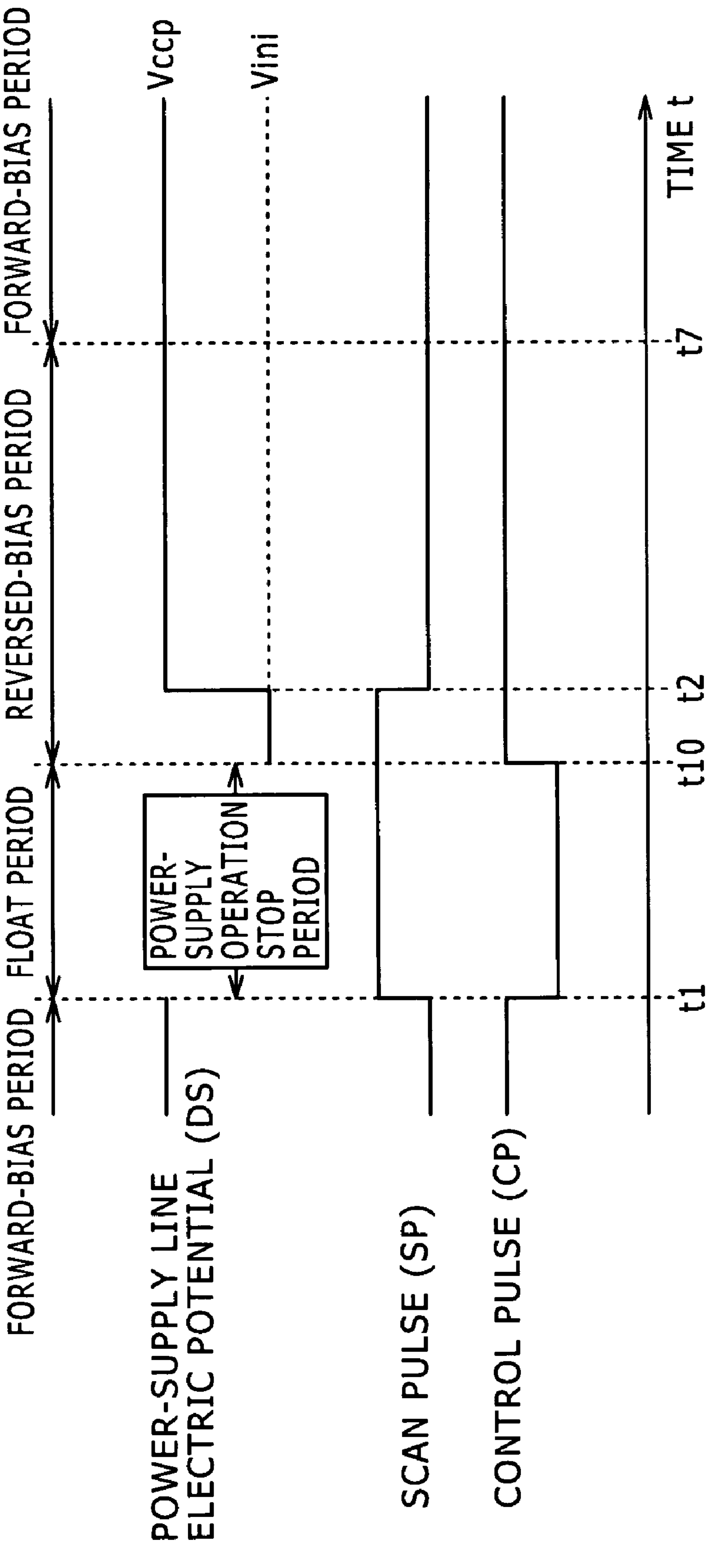
FIG. 13 is a timing diagram showing relations between timings with which an electric potential DS asserted on a power-supply line, a scan pulse SP and a control pulse CP are generated in the power-supply scan circuit according to the first embodiment.

FIG. 13 is a timing diagram showing relations between timings with which the electric potential DS asserted on the power-supply line 32, the scan pulse SP and the control pulse CP are generated in the power-supply scan circuit 50A.

In periods during which the scan pulse SP is set at a low level, that is, in a period prior to a time t1 and a period after a time t2, the P-channel MOS transistor Qp is set in a conductive state and the positive-side power-supply electric potential VDD is asserted on the power-supply line 32-*i* as the first power-supply electric potential Vccp. In a period during which the scan pulse SP is set at a high level, that is, in a period between the times t1 and t2, on the other hand, the N-channel MOS transistor Qn is set in a conductive state. In a period between the time t1 and a time t10, however, the control pulse CP is set at a low level, putting the switch device SW in a turned-off state. With the switch device SW put in a turned-off state, the operation to assert the electric potential DS, which can be the first power-supply electric potential Vccp or the second power-supply electric potential Vini, on the power-supply line 32-*i* is stopped. Then, at the time t10, the control pulse CP is changed from the low level to a high level, putting the switch device SW in a turned-on state. With the switch device SW put in a turned-on state, the N-channel MOS transistor Qn asserts the negative-side power-supply electric potential VSS on the power-supply line 32-*i* as the second power-supply electric potential Vini.

Second Embodiment

Figure 14:
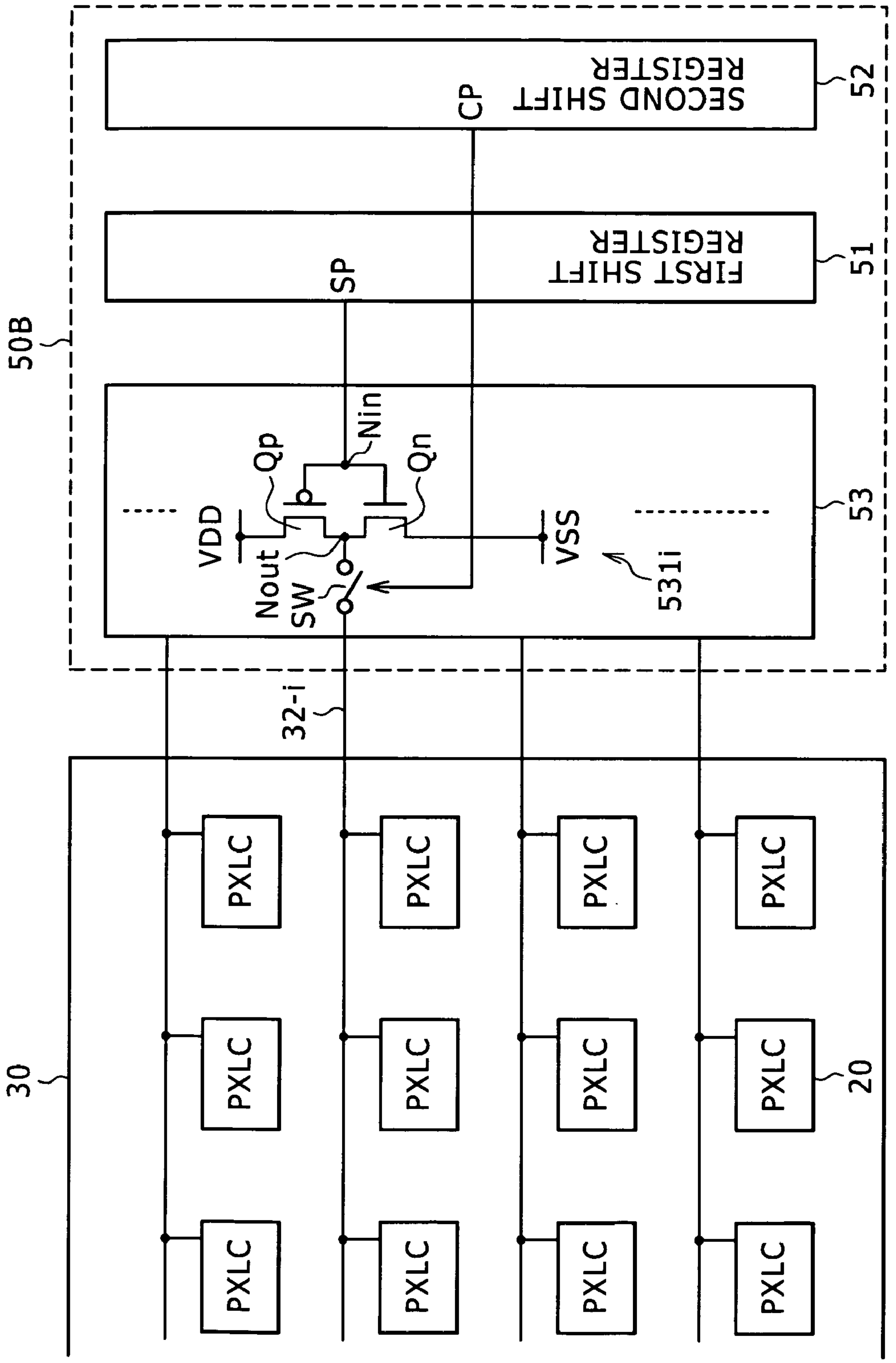
FIG. 14 is a block diagram showing the configurations of a pixel matrix section and a power-supply scan circuit according to a second embodiment of the present invention.

FIG. 14 is a block diagram showing the configurations of the pixel matrix section 30 and a power-supply scan circuit 50B according to a second embodiment of the present invention. In the block diagram of FIG. 14, sections identical with their respective counterparts employed in the configurations shown in the block diagram of FIG. 12 are denoted by the same reference notations as the counterparts. Much like the power-supply scan circuit 50A according to the first embodiment, the power-supply scan circuit 50B according to the second embodiment has a configuration including a first shift register 51, a second shift register 52 and an output section 53.

However, the configuration of the buffer 531*i* employed in the output section 53 of the power-supply scan circuit 50B according to the second embodiment is different from the configuration of the buffer 531*i* employed in the output section 53 of the power-supply scan circuit 50A according to the first embodiment. To put it concretely, in the configuration of the buffer 531*i* employed in the output section 53 of the power-supply scan circuit 50A according to the first embodiment, the switch device SW is connected between the source electrode of the N-channel MOS transistor Qn and the power-supply line of the negative-side power-supply electric potential VSS. In the configuration of the buffer 531*i* employed in the output section 53 of the power-supply scan circuit 50B according to the second embodiment, on the other hand, the switch device SW is connected between the output node Nout and the power-supply line 32-*i*.

Much like the power-supply scan circuit 50A according to the first embodiment, the switch device SW is controlled by the control pulse CP. When the N-channel MOS transistor Qn is put in a conductive state, the negative-side power-supply electric potential VSS is output to the power-supply line 32-*i* by way of the output node Nout as the second power-supply electric potential Vini. Since the switch device SW is put in a turned-off state during the period between the times t1 and t10, however, the operation to output the negative-side power-supply electric potential VSS to the power-supply line 32-*i* by way of the output node Nout as the second power-supply electric potential Vini is halted. In the period between the times t10 and t2, the switch device SW is put in a turned-on state, outputting the negative-side power-supply electric potential VSS to the power-supply line 32-*i* by way of the output node Nout as the second power-supply electric potential Vini.

By employing the power-supply scan circuit 50A according to the first embodiment and the power-supply scan circuit 50B according to the second embodiment as described above, it is possible to prevent a reversed bias from being applied to the organic EL device 21 during a portion of the no-light emission period of the organic EL device 21 without making use of a special control device in the pixel circuit 20.

It is to be noted, however, that implementations of the power-supply scan circuit 50 are by no means limited to the power-supply scan circuit 50A according to the first embodiment and the power-supply scan circuit 50B according to the second embodiment. That is, the power-supply scan circuit 50 can have any configuration as long as the configuration is capable of stopping the operation to assert the electric potential DS on the power-supply line 32 during a portion of the no-light emission period of the organic EL device 21.

Modified Versions

In the embodiments each described above as a typical example, the driving circuit employed in the pixel circuit 20 to serve as a circuit for driving the organic EL device 21 basically includes two transistors, i.e., the device driving transistor 22 and the signal writing transistor 23. However, applications of the present invention are by no means limited to this pixel configuration. For example, the present invention can also be applied to a variety of conceivable pixel configurations including a configuration having a switching transistor for selectively supplying the reference electric potential Vofs to the gate electrode of the device driving transistor 22.

On top of that, even though each of the embodiments described above is applied to an active-matrix organic EL display apparatus 10 employing pixel circuits 20 each having an organic EL device to serve as the electro optical device, the scope of the present invention is by no means limited to these embodiments. To put it concretely, the present invention can be applied to general display apparatus each employing pixel circuits each having a current-driven light emitting device (or an electro optical device) for emitting light with a luminance according to the magnitude of a current flowing through the device. Examples of such a current-driven electro optical device are the inorganic EL device, an LED (Light Emitting Diode) device and a semiconductor laser device.

APPLICATION EXAMPLES

The display apparatus according to the embodiments of the present invention described above is typically employed in a variety of electronic instruments shown in diagrams of FIGS. 15 to 19 as instruments used in all fields. Typical examples of the electronic instruments are a digital camera, a notebook personal computer, a portable terminal such as a cellular phone and a video camera. In each of these electronic instruments, the display apparatus is used for displaying a video signal supplied thereto or generated therein as an image or a video.

By employing the display apparatus according to the embodiments of the present invention in a variety of electronic instruments used in all fields as the display unit of each of the instruments, each of the electronic instruments is capable of displaying an image having a high quality. That is, as is obvious from the descriptions of the embodiments, the display apparatus provided by the present invention is capable of reducing the amount of electrical stress generated in the organic EL device 21 by a reversed bias which is applied to the organic EL device 21 during a no-light emission period. Therefore, it is possible to prevent the characteristics of the organic EL device 21 from changing and the organic EL device 21 from becoming defective in a state of being incapable of emitting light due to the electrical stress. As a result, the quality of the displayed image can be improved.

The display apparatus according to the embodiments of the present invention include an apparatus constructed into a modular shape with a sealed configuration. For example, the display apparatus according to the embodiments of the present invention is designed into a configuration in which the pixel matrix section 30 is implemented as a display module created by attaching the module to a facing unit made of a material such as transparent glass. On the transparent facing unit, components such as a color filter and a protection film can be created in addition to a shielding film described earlier. It is to be noted that the display module serving as the pixel matrix section 30 may include components such as a circuit for supplying a signal received from an external source to the pixel matrix section 30, a circuit for supplying a signal received from the pixel matrix section 30 to an external destination and an FPC (Flexible Print Circuit).

The following description explains concrete implementations of the electronic instruments to which the embodiments of the present invention are applied.

Figure 15:
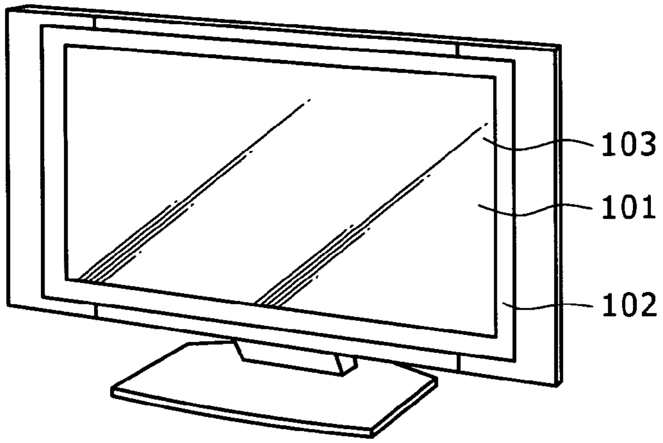
FIG. 15 is a diagram showing a squint view of the external appearance of a TV set to which the embodiments of the present invention is applied.

FIG. 15 is a diagram showing a squint view of the external appearance of a TV set to which the embodiments of the present invention are applied. The TV set serving as a typical implementation of the electronic instrument to which the embodiments of the present invention are applied employs a front panel 102 and a video display screen section 101 which is typically a filter glass plate 103. The TV set is constructed by employing the display apparatus provided by the embodiments of the present invention in the TV set as the video display screen section 101.

Figure 16A:
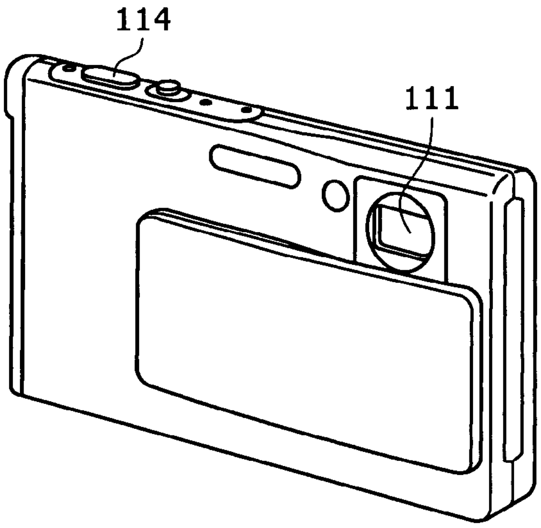
FIG. 16A is a diagram showing a squint view of the external appearance of the digital camera seen from a position on the front side of the digital camera.
Figure 16B:
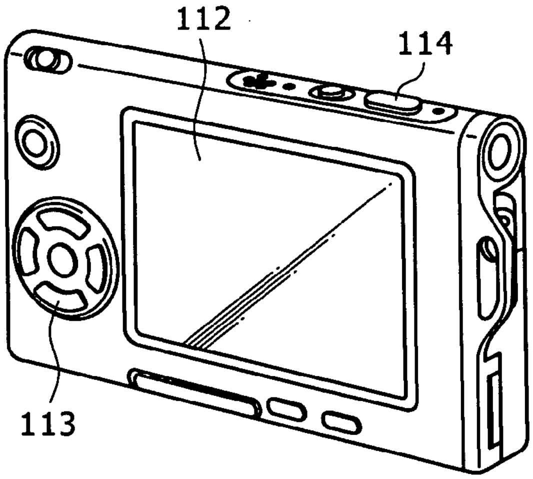
FIG. 16B is a diagram showing a squint view of the external appearance of the digital camera seen from a position on the rear side of the digital camera.

FIG. 16 is a plurality of diagrams each showing a squint view of the external appearance of a digital camera to which the embodiments of the present invention are applied. To be more specific, FIG. 16A is a diagram showing a squint view of the external appearance of the digital camera seen from a position on the front side of the digital camera whereas FIG. 16B is a diagram showing a squint view of the external appearance of the digital camera seen from a position on the rear side of the digital camera. The digital camera serving as a typical implementation of the electronic instrument to which the embodiments of the present invention are applied employs a light emitting section 111 for generating a flash, a display section 112, a menu switch 113 and a shutter button 114. The digital camera is constructed by employing the display apparatus provided by the embodiments of the present invention in the digital camera as the display section 112.

Figure 17:
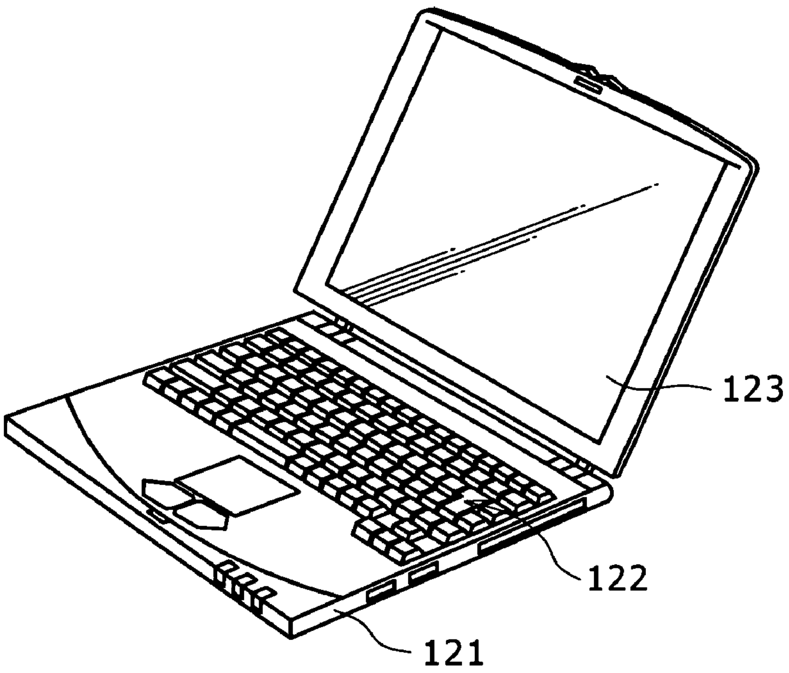
FIG. 17 is a diagram showing a squint view of the external appearance of a notebook personal computer to which the embodiments of the present invention is applied.

FIG. 17 is a diagram showing a squint view of the external appearance of a notebook personal computer to which the embodiments of the present invention are applied. The notebook personal computer serving as a typical implementation of the electronic instrument to which the embodiments of the present invention are applied employs a main body 121 including a keyboard 122 to be operated by the user for entering characters and a display section 123 for displaying an image. The notebook personal computer is constructed by employing the display apparatus provided by the embodiments of the present invention in the personal computer as the display section 123.

Figure 18:
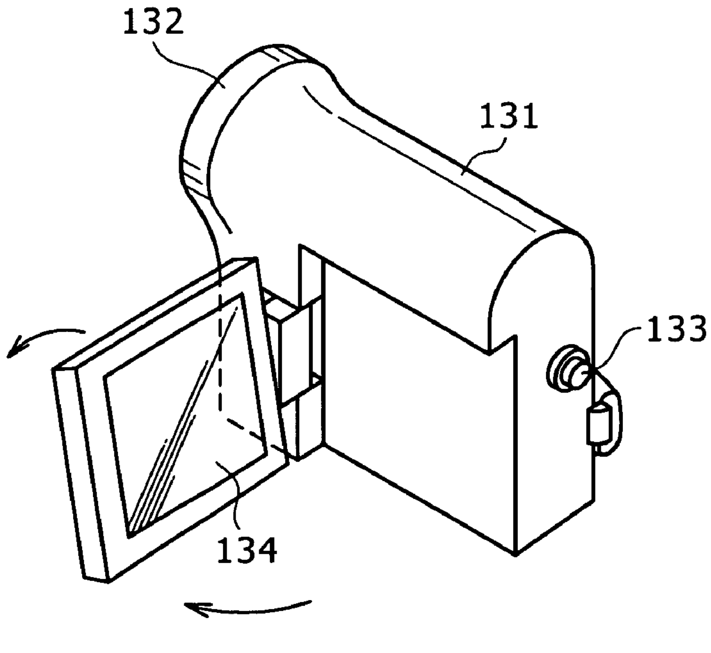
FIG. 18 is a diagram showing a squint view of the external appearance of a video camera to which the embodiments of the present invention is applied.
Figure 19A:
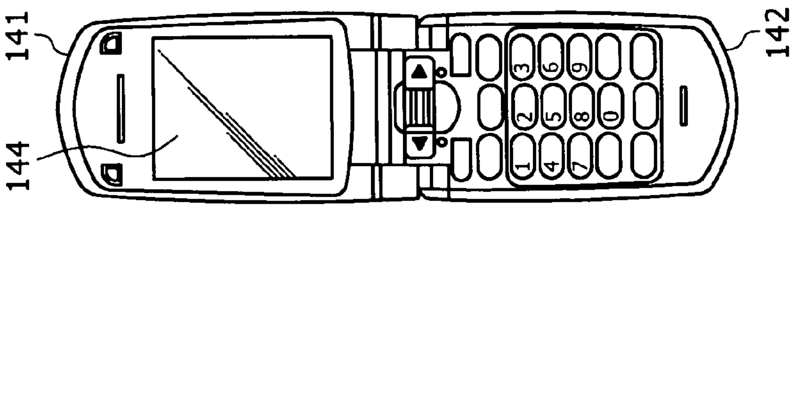
FIG. 19A is a diagram showing the front view of the cellular phone in a state of being already opened.
Figure 19B:
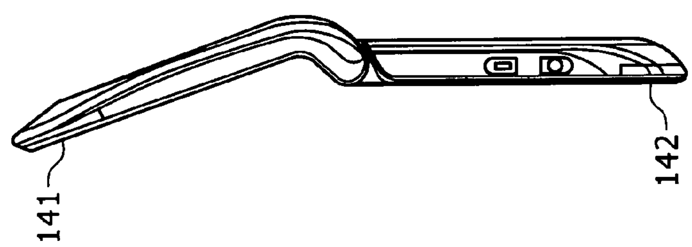
FIG. 19B is a diagram showing a side of the cellular phone in a state of being already opened.
Figure 19C:
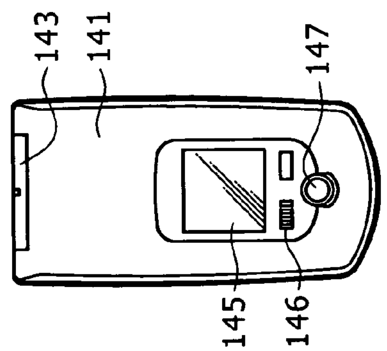
FIG. 19C is a diagram showing the front view of the cellular phone in a state of being already closed.
Figure 19D:
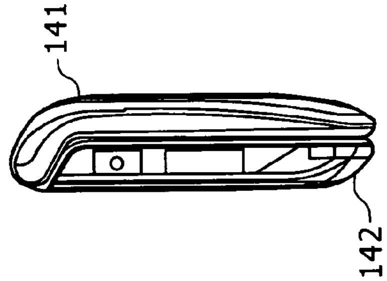
FIG. 19D is a diagram showing the left side of the cellular phone in a state of being already closed.
Figure 19E:
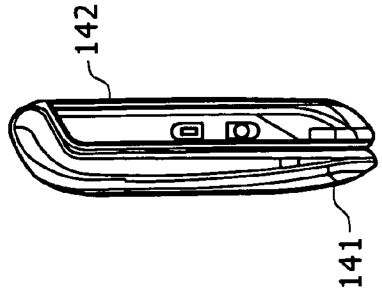
FIG. 19E is a diagram showing the right side of the cellular phone in a state of being already closed.
Figure 19F:
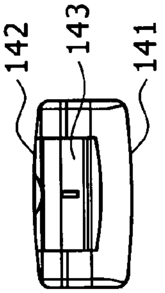
FIG. 19F is a diagram showing the top view of the cellular phone in a state of being already closed.
Figure 19G:
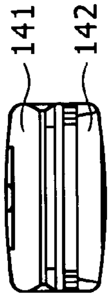
FIG. 19G is a diagram showing the bottom view of the cellular phone in a state of being already closed.

FIG. 18 is a diagram showing a squint view of the external appearance of a video camera to which the embodiments of the present invention are applied. The video camera serving as a typical implementation of the electronic instrument to which the embodiments of the present invention are applied employs a main body 131, a photographing lens 132, a start/stop switch 133 and a display section 134. Provided on the front face of the video camera, the photographing lens 132 oriented in the forward direction is a lens for taking a picture of a subject of photographing. The start/stop switch 133 is a switch to be operated by the user to start or stop a photographing operation. The video camera is constructed by employing the display apparatus provided by the embodiments of the present invention in the video camera as the display section 134.

FIG. 19 is a plurality of diagrams each showing the external appearance of a portable terminal such as a cellular phone to which the embodiments of the present invention are applied. To be more specific, FIG. 19A is a diagram showing the front view of the cellular phone in a state of being already opened. FIG. 19B is a diagram showing a side of the cellular phone in a state of being already opened. FIG. 19C is a diagram showing the front view of the cellular phone in a state of being already closed. FIG. 19D is a diagram showing the left side of the cellular phone in a state of being already closed. FIG. 19E is a diagram showing the right side of the cellular phone in a state of being already closed. FIG. 19F is a diagram showing the top view of the cellular phone in a state of being already closed. FIG. 19G is a diagram showing the bottom view of the cellular phone in a state of being already closed. The cellular phone serving as a typical implementation of the electronic instrument to which the embodiments of the present invention are applied employs an upper case 141, a lower case 142, a link section 143 which is a hinge, a display section 144, a display sub-section 145, a picture light 146 and a camera 147. The cellular phone is constructed by employing the display apparatus provided by the embodiments of the present invention in the cellular phone as the display section 144 and/or the display sub-section 145.

The present application contains subject matter related to that disclosed in Japanese Priority Patent Application JP 2008-121999 filed in the Japan Patent Office on May 8, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A display apparatus comprising:

a pixel matrix section including pixel circuits laid out to form a pixel matrix to serve as pixel circuits each having an electro optical device configured to provide a light emission period and a no-light emission period, a signal writing transistor for writing a video signal, a signal storage capacitor for holding the video signal written by the signal writing transistor, and a device driving transistor for driving the electro optical device in accordance with the video signal held by the signal storage capacitor, the signal storage capacitor having a first terminal connected to a gate terminal of the device driving transistor and a second terminal connected to a first current terminal of the device driving transistor, and a power-supply section configured to change a power-supply electric potential appearing on a power-supply line that is connected to a second current terminal of the device driving transistor, said change of the power-supply electric potential appearing on the power supply line by the power-supply section comprising a first potential being applied to the power-supply line for providing a driving current flowing through the device driving transistor during the light emission period, the power-supply line being floated by disconnecting the power-supply line from the power-supply electric potential within a first portion of the no-light emission period, and a second potential being applied to the power-supply line during a second portion of the no-light emission period that occurs after the first portion, the second potential being set to cause a reverse bias of the electro optical device, wherein the power-supply section is configured to provide the first potential throughout a write period of writing the video signal.

2. The display apparatus according to claim 1, wherein the write period and a mobility correction period occur concurrently.

3. A driving method provided for a display apparatus including pixel circuits laid out to form a pixel matrix to serve as pixel circuits each having an electro optical device configured to provide a light emitting period and a no-light emitting period, a signal writing transistor for writing a video signal, a signal storage capacitor for holding the video signal written by the signal writing transistor, and a device driving transistor for driving the electro optical device in accordance with the video signal held by the signal storage capacitor, the signal capacitor having a first terminal connected to a gate of the device driving transistor and a second terminal connected to a first current terminal of the device driving transistor, the driving method comprising:

changing a power-supply electric potential appearing on a power-supply line that is connected to a second current terminal of the device driving transistor, said changing the power-supply electric potential appearing on the power-supply line comprising a first potential being applied to the power-supply line for providing a driving current flowing through the device driving transistor during the light emission period, the power-supply line being floated by disconnecting the power-supply line from the power-supply electric potential within a first portion of the no-light emission period, and a second potential being applied to the power-supply line during a second portion of the no-light emission period that occurs after the first portion, the second potential being set to cause a reverse bias of the electro optical device, wherein said changing the power-supply electric potential provides the first potential throughout a write period of writing the video signal.

4. The driving method according to claim 3, wherein the write period and a mobility correction period occur concurrently.

5. An electronic device employing a display apparatus comprising:

a pixel matrix section including pixel circuits laid out to form a pixel matrix to serve as pixel circuits each having an electro optical device configured to have a light emission period and a no-light emission period, a signal writing transistor for writing a video signal into a signal storage capacitor, the signal storage capacitor for holding the video signal written by the signal writing transistor, and a device driving transistor for driving the electro optical device in accordance with the video signal held by the signal storage capacitor, the signal storage capacitor having a first terminal connected to a gate terminal of the device driving transistor, the second terminal connected to a current terminal of the device driving transistor, and a power-supply section configured to change a power-supply electric potential appearing on a power-supply line that is connected to a second current terminal of the device driving transistor, said change of the power-supply electric potential appearing on the power supply line by the power-supply section comprising a first potential being applied to the power-supply line for providing a driving current flowing through the device driving transistor during the light emission period, the power-supply line being floated by disconnecting the power-supply line from the power-supply electric potential within a first portion of the no-light emission period, and a second potential being applied to the power-supply line during a second portion of the no-light emission period that occurs after the first portion, the second potential being set to cause a reverse bias of the electro optical device, wherein the power-supply section is configured to provide the first potential throughout a write period of writing the video signal.

6. The electronic device according to claim 5, wherein the write period and a mobility correction period occur concurrently.

7. A display apparatus comprising:

pixel matrix means including pixel circuits laid out to form a pixel matrix to serve as pixel circuits each having an electro optical device having a light emission period and a no-light emission period, a signal writing transistor for writing a video signal, a signal storage capacitor for holding the video signal written by the signal writing transistor, and a device driving transistor for driving the electro optical device in accordance with the video signal held by the signal storage capacitor, the signal storage capacitor having a first terminal connected to a gate terminal of the device driving transistor and a second terminal connected to a first current terminal of the device driving transistor, and power-supply means for changing a power-supply electric potential appearing on a power-supply line that is connected to a second current terminal of the device driving transistor, said changing the power-supply electric potential appearing on the power-supply line comprising a first potential being applied to the power-supply line for providing a driving current flowing through the device driving transistor during the light emission period, the power-supply line being floated by disconnecting the power-supply line from the power-supply electric potential within a first portion of the no-light emission period, and a second potential being applied to the power-supply line during a second portion of the no-light emission period that occurs after the first portion, the second potential being set to cause a reverse bias of the electro optical device, wherein the power-supply means is configured to provide the first potential throughout a write period of writing the video signal.

8. The display apparatus according to claim 7, wherein the write period and a mobility correction period occur concurrently.

* * * * *